US012218732B2

(12) United States Patent
Raghavan

(10) Patent No.: US 12,218,732 B2
(45) Date of Patent: Feb. 4, 2025

(54) CONFIGURATION OF A REDUCED NUMBER OF TCI STATES IN RESPONSE TO BEAM FAILURE OVER A RANGE OF DIRECTIONS

(71) Applicant: QUALCOMM Incorporated, San Diego, CA (US)

(72) Inventor: Vasanthan Raghavan, West Windsor Township, NJ (US)

(*) Notice: Subject to any disclaimer, the term of this patent is extended or adjusted under 35 U.S.C. 154(b) by 0 days.

(21) Appl. No.: 18/344,234

(22) Filed: Jun. 29, 2023

(65) Prior Publication Data
US 2025/0007595 A1   Jan. 2, 2025

(51) Int. Cl.
*H04B 7/06* (2006.01)
*H04B 17/318* (2015.01)

(52) U.S. Cl.
CPC ....... *H04B 7/06962* (2023.05); *H04B 17/318* (2015.01)

(58) Field of Classification Search
CPC ............... H04B 7/06962; H04B 17/318
See application file for complete search history.

(56) References Cited

U.S. PATENT DOCUMENTS

2020/0162208 A1* 5/2020 Moon .............. H04W 72/0446
2020/0314934 A1* 10/2020 Raghavan ........... H04W 76/15
2022/0060223 A1    2/2022 Jung et al.

FOREIGN PATENT DOCUMENTS

WO    2023108593 A1    6/2023

OTHER PUBLICATIONS

Partial International Search Report and Written Opinion—PCT/US2024/032866—ISA/EPO—Jan. 10, 2024.

* cited by examiner

Primary Examiner — Vineeta S Panwalkar

(57) ABSTRACT

Certain aspects of the present disclosure provide techniques for improving beam management. An example method includes receiving, from a network entity, configuration information configuring the UE with a set of transmission configuration indicator (TCI) states, wherein the configured set of TCI states comprises a first number of TCI states for use in communicating with the network entity, detecting a change in an operation mode of the UE from a first operation mode to a second operation mode, and transmitting, based on the detected change in the operation mode of the UE, information to the network entity indicating the UE will monitor and report on a reduced second number of TCI states of the configured set of TCI states relative to the first number of TCI states.

30 Claims, 11 Drawing Sheets

CONFIGURATION OF A REDUCED NUMBER OF TCI STATES IN RESPONSE TO BEAM FAILURE OVER A RANGE OF DIRECTIONS

BACKGROUND

Field of the Disclosure

Aspects of the present disclosure relate to wireless communications, and more particularly, to techniques for configuring a reduced number of TCI states in response to a beam failure over a range of directions.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving, from a network entity, configuration information configuring the UE with a set of transmission configuration indicator (TCI) states, wherein the configured set of TCI states comprises a first number of TCI states for use in communicating with the network entity; detecting a change in an operation mode of the UE from a first operation mode to a second operation mode; and transmitting, based on the detected change in the operation mode of the UE, information to the network entity indicating the UE will monitor and report on a reduced second number of TCI states of the configured set of TCI states relative to the first number of TCI states.

Another aspect provides a method for wireless communication by a network entity. The method includes transmitting, to a user equipment (UE), configuration information configuring the UE with a set of transmission configuration indicator (TCI) states, wherein the configured set of TCI states comprises a first number of TCI states for use in communicating with the network entity; and receiving information, from the UE, indicating the UE will monitor and report on a reduced second number of TCI states of the configured set of TCI states relative to the first number of TCI states.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
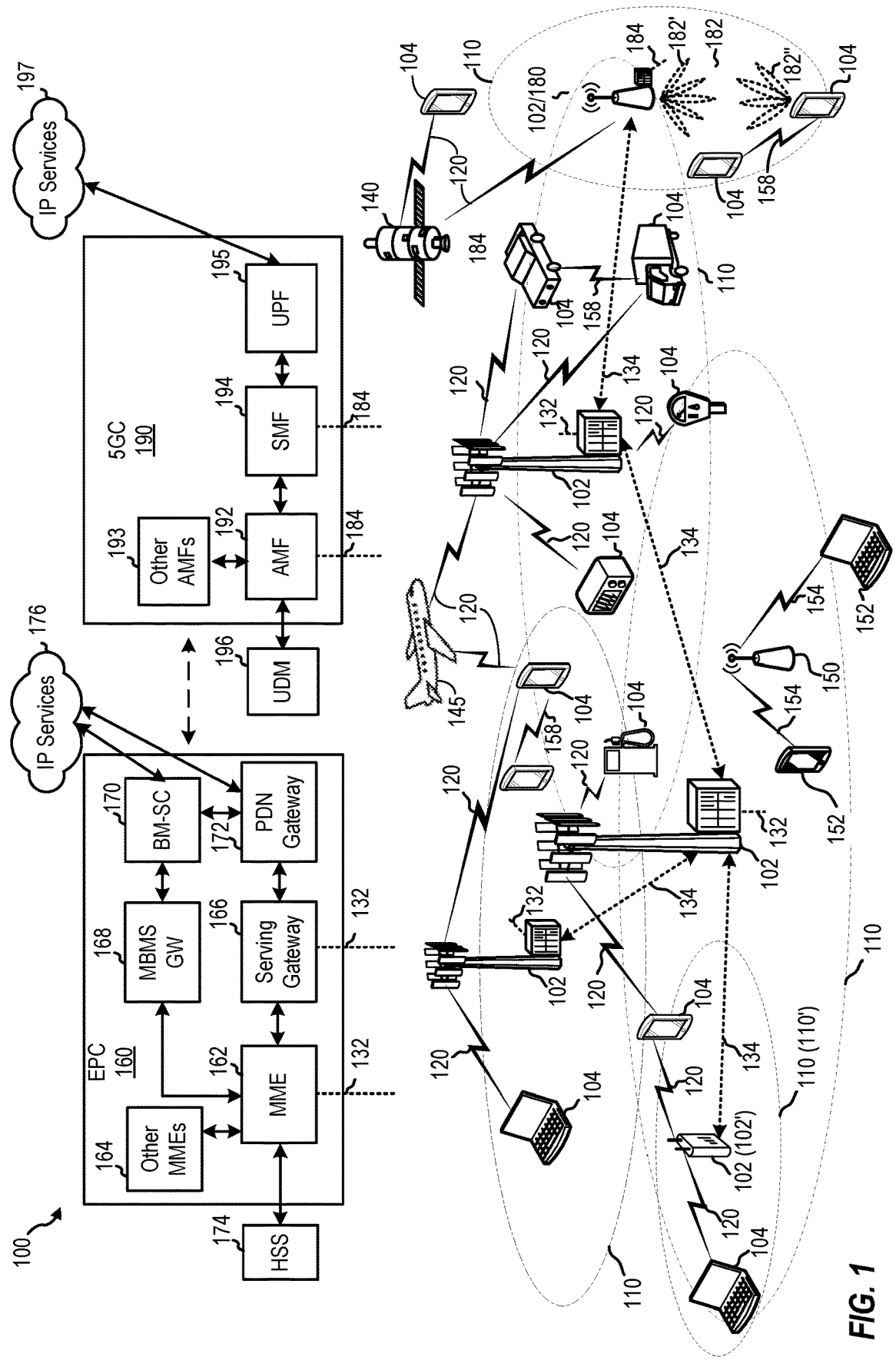
FIG. 1 depicts an example wireless communications network.

Aspects of the present disclosure provide apparatuses, methods, processing systems, and computer-readable mediums for improving beam management.

For example, in some cases, a user equipment (UE) may be configured with a set of transmission configuration indicator (TCI) states. Each TCI state may be associated with a different communication beam pair that may be used for beamformed communication (e.g., communication based on narrow communication beams pointed in different spatial directions) between the UE and a network entity, such as a base station. Each communication beam pair may include a communication beam of the UE and a communication beam of the network entity. In some cases, during the course of communication, the network entity may instruct the UE to switch between different TCI states and associated communication beams-a technique known as beam switching. Switching between TCI state/communication beams may help to ensure that communication between the UE and the network entity remains above a certain performance threshold. For example, when communication based on a first TCI state/communication beam falls below the performance threshold, the UE may be instructed to switch to a different TCI state/communication beam with better performance.

In some cases, to support beam switching, the UE may be configured to periodically perform signal strength measurements for the configured set of TCI states and their associated communication beams. These signal strength measurements may be reported back to the network entity with additional information identifying the TCI state/communication beam to which each signal strength measurement corresponds. In some cases, this identification information may comprise a synchronization signal block resource identifiers (SSBRIs) and may be ranked from highest signal strength measurement to lowest signal strength measurement among the different configured TCI states/communication beams. This ranking may indicate to the network entity which TCI states/communication beams are the best candidates for beam switching.

In some cases, the UE may operate in different operation modes. In some cases, these different operation modes may be associated with different form factors of the UE or whether an antenna module of the UE is being blocked (e.g., by a user's finger). For example, in some cases, the UE may include a hinge that allows the UE to fold/flip. In some cases, the different operation modes may comprise, for example, a first operation mode in which the hinge is in an open position and a second operation mode in which the hinge is in a closed position. In other cases, the different operation modes may include a first operation mode in which an antenna module of the UE is not being blocked by a user's fingers (or by some other means) and a second operation mode in which the antenna module of the UE is being blocked by the user's fingers (or by the other means).

In some cases, while operating, the UE may detect a change in an operation mode of the UE from a first operation mode to a second operation mode. In some cases, this change in the operation mode may negatively affect the TCI states in the configured set TCI states and associated communication beams on which the UE is configured to perform the signal strength measurements and associated reporting. For example, in some cases, one or more TCI states in the configured set of TCI states that may have good performance (e.g., greater than or equal to a performance threshold) in the first operation mode may subsequently have poor performance (e.g., below the performance threshold) in the second operation mode. Such degradation in performance may be due to a variety of reasons, such as a portion of an antenna module of the UE becoming occluded due to the hinge of the UE being in a closed position, due to a portion of the antenna module of the UE becoming blocked by a user's fingers, etc.

In some cases, when the one or more TCI states experience this performance degradation due to the change in operation mode, continuing to perform the signal strength measurements and transmit the reports to the network entity for these TCI state may unnecessarily consume time-frequency resources within the network as well as power resources at the UE and network entity. Accordingly, in some cases, it may be advantageous to allow the UE to indicate failure of a collection of TCI states/communication beams due to a change in an operation mode of the UE and to report on a reduced number of TCI states/communication beams. For example, by allowing the UE to report on a reduced number of TCI states/communication beams, the unnecessary consumption of time-frequency resources associated with CSI reporting for TCI states/communication beams that experience significant performance loss in certain operation modes may be reduced. Moreover, power resources at the UE may be conserved by not having to perform measurements and generate reporting for the TCI states/communication beams with poor performance. Similarly, power resources at the network entity may be conserved by not having to receive and decode reporting information for these TCI states/communication beams with poor performance.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
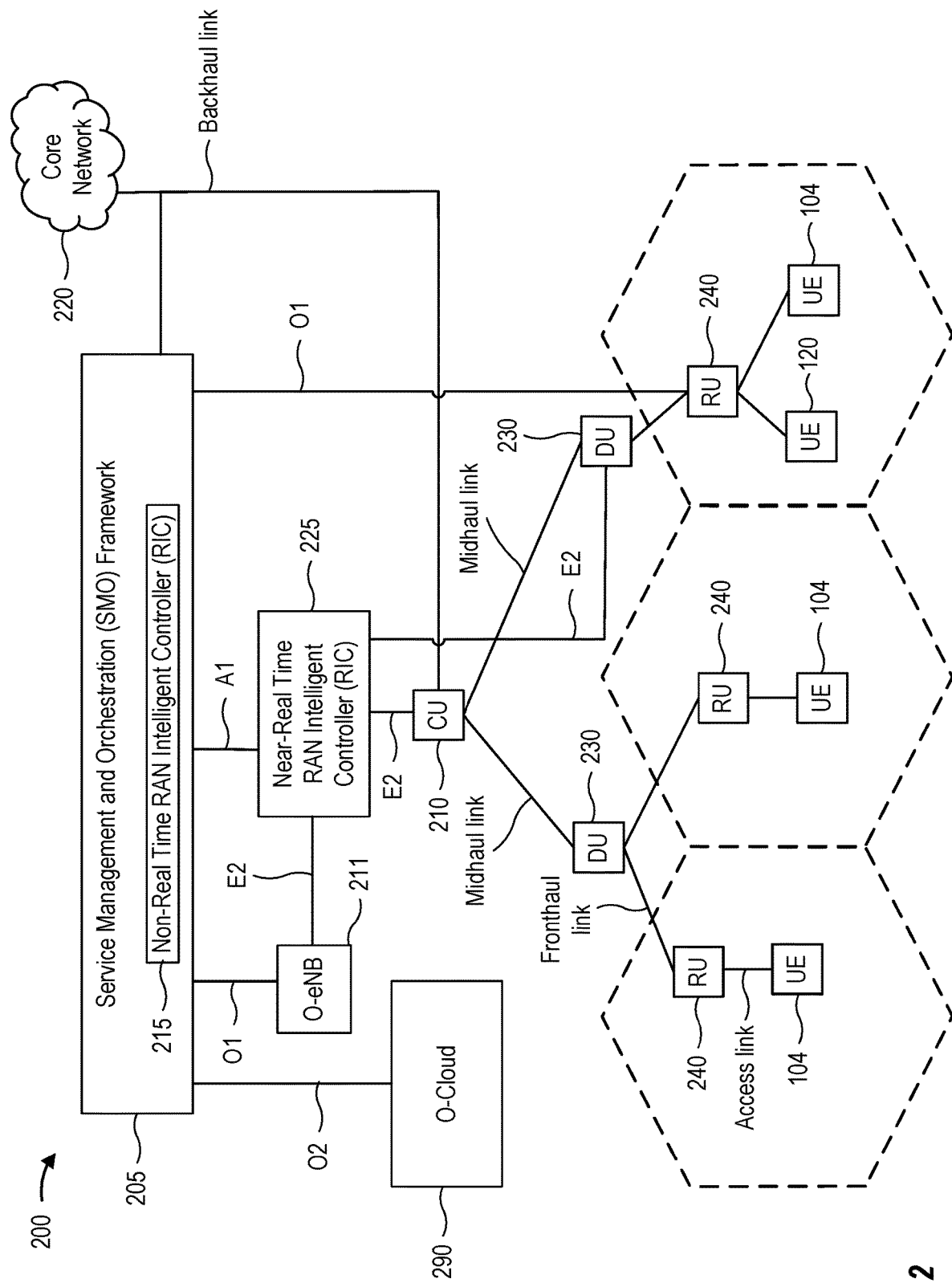
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHZ-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
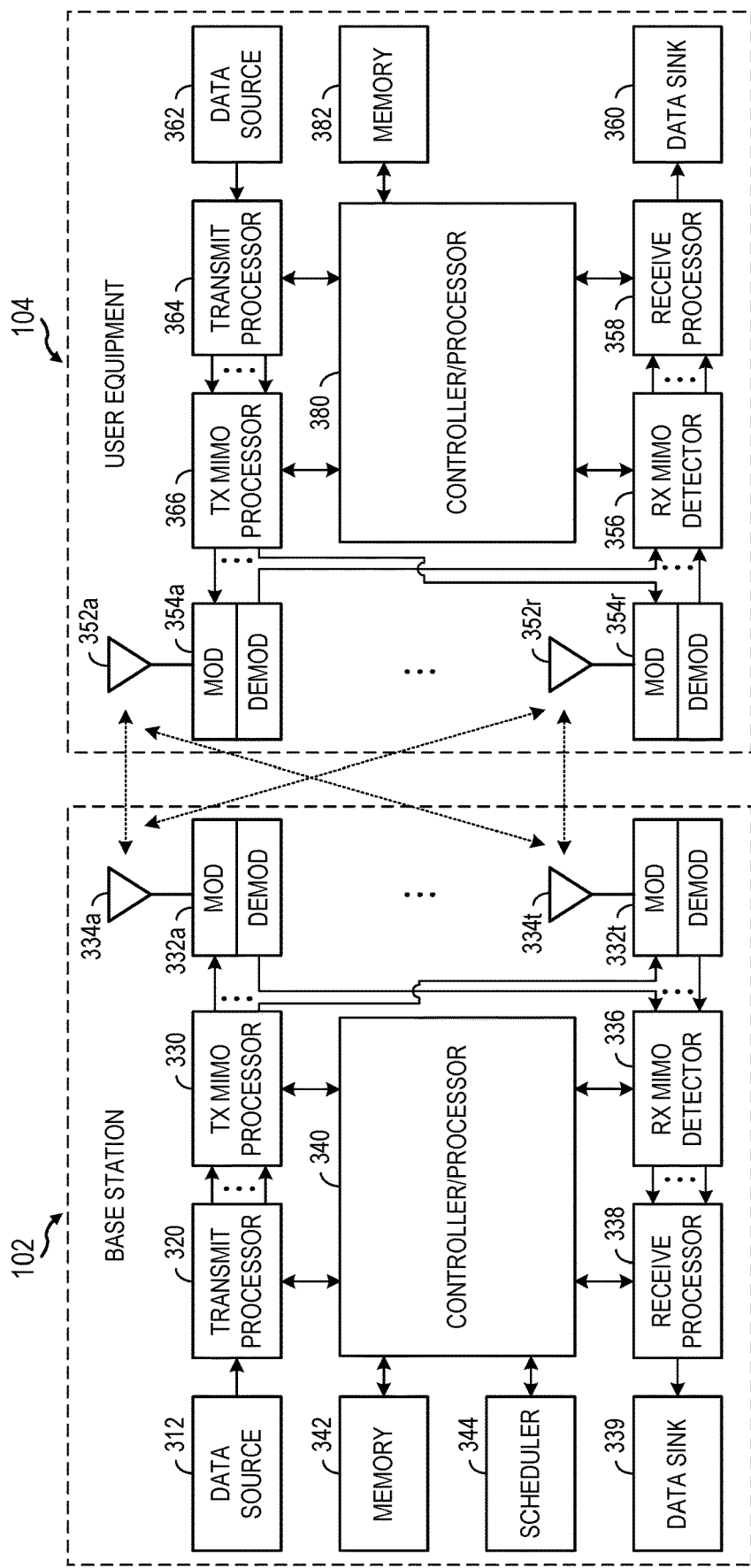
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example. BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-*332*t*. Each modulator in transceivers 332*a-*332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-*332*t* may be transmitted via the antennas 334*a-*334*t*, respectively.

In order to receive the downlink transmission, UE 104 includes antennas 352*a-*352*r* that may receive the downlink signals from the BS 102 and may provide received signals to the demodulators (DEMODs) in transceivers 354*a-*354*r*, respectively. Each demodulator in transceivers 354*a-*354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-*354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-*354*r* (e.g., for SC-FDM), and transmitted to BS 102.

At BS 102, the uplink signals from UE 104 may be received by antennas 334*a-t*, processed by the demodulators in transceivers 332*a-*332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting"

may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
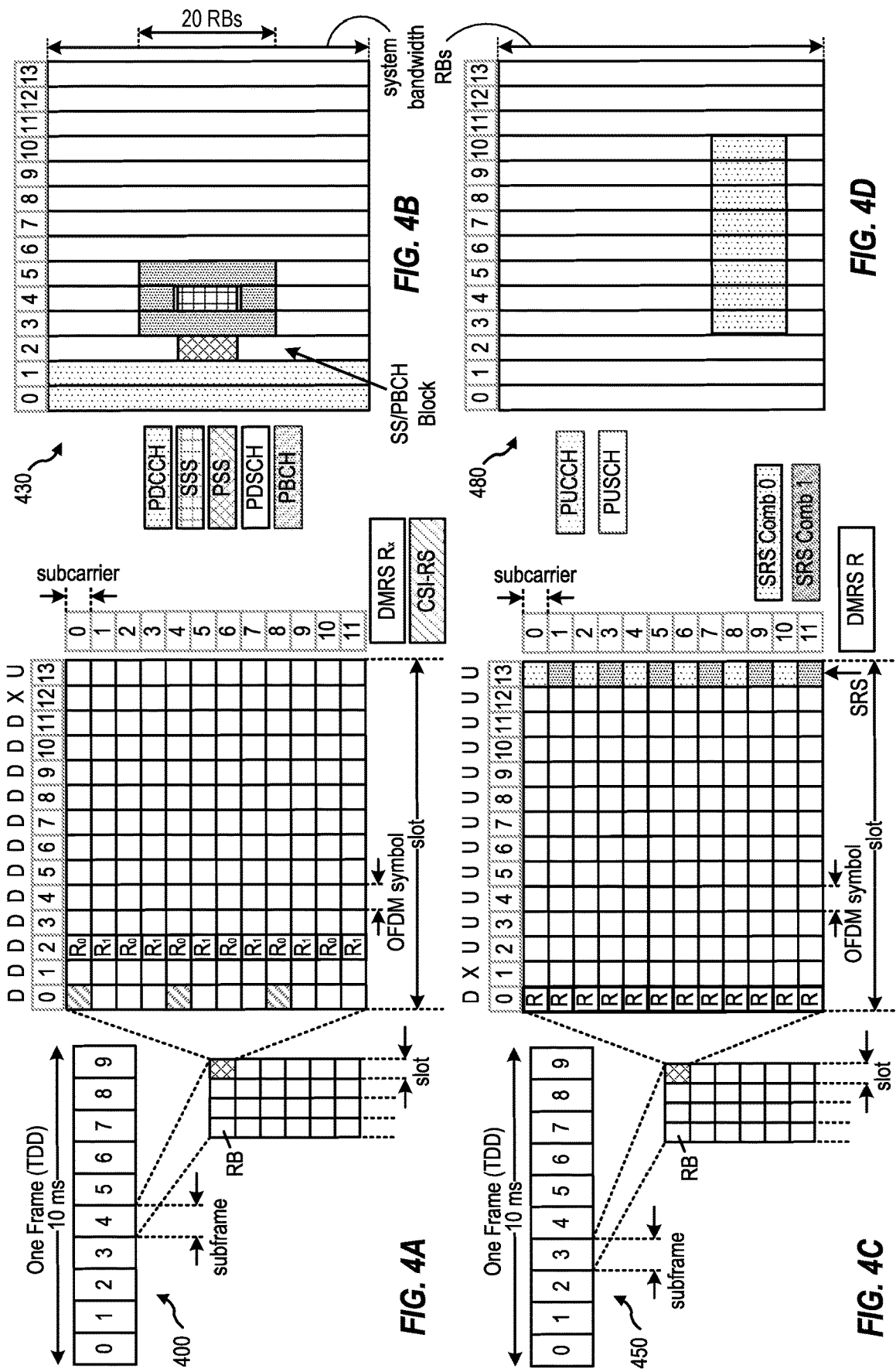
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where u is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Beamforming and Beam Management

Figure 5:
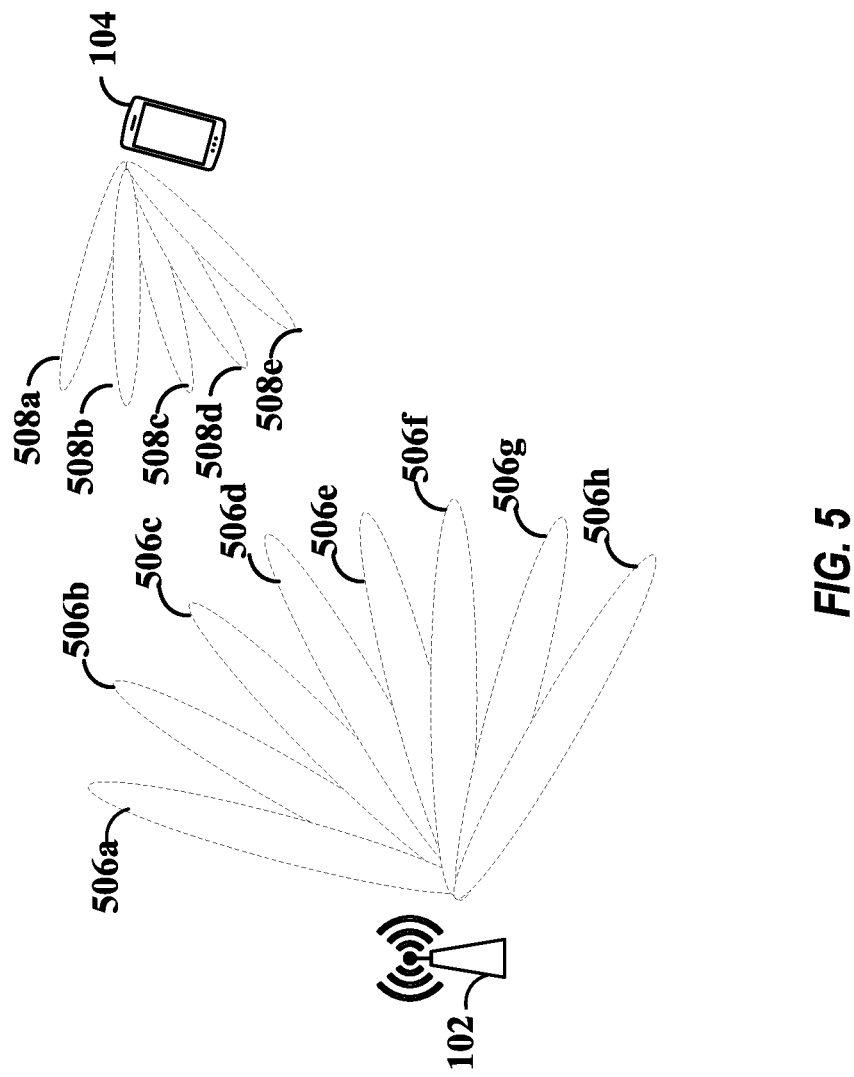
FIG. 5 illustrates communication between a base station and a user equipment using beamformed signals.

FIG. 5 is a diagram illustrating communication between the BS 102 and the UE 104 using beamformed signals according to some aspects. In the example shown in FIG. 5, the BS 102 may be configured to generate a plurality of beams 506a-506h, each associated with a different beam direction. In addition, the UE 104 is configured to generate a plurality of beams 508a-508e, each associated with a different beam direction. The BS 102 and UE 104 may select one or more beams 506a-506h of the BS 102 and one or more beams 508a-508e of the UE 104 for communication of uplink and downlink signals therebetween using a downlink beam management scheme and/or an uplink beam management scheme.

In an example of a downlink beam management scheme for selection of downlink beams, the BS 102 may be configured to sweep or transmit on each of a plurality of downlink transmit beams 506a-506h during one or more synchronization slots. For example, the BS 102 may transmit a reference signal, such as a synchronization signal block (SSB) or a channel state information reference signal (CSI-RS), on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 506a-506h transmitted during a same symbol may not be adjacent to one another. In some examples, the BS 102 may transmit more or less beams distributed in all directions (e.g., 360 degrees).

In addition, the UE 104 is configured to receive the downlink beam reference signals on a plurality of downlink receive beams 508a-508c. In some examples, the UE 104 searches for and identifies each of the downlink transmit beams 506a-506h based on the beam reference signals. The UE 104 then performs beam measurements (e.g., RSRP, SINR, RSRQ, etc.) on the beam reference signals on each of the downlink receive beams 508a-508e to determine the respective beam quality of each of the downlink transmit beams 506a-506h as measured on each of the downlink receive beams 508a-508c.

The UE 104 can generate and transmit a beam measurement report, including the respective beam index and beam measurement of each downlink transmit beam 506a-506h on each downlink receive beam 508a-508e to the BS 102. The BS 102 may then select one or more downlink transmit beams on which to transmit unicast downlink control information and/or user data traffic to the UE 104. In some examples, the selected downlink transmit beam(s) have the highest gain from the beam measurement report. In some examples, the UE 104 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The BS 102 or the UE 104 may further select a corresponding downlink receive beam on the UE 104 for each selected serving downlink transmit beam to form a respective downlink beam pair link (BPL) for each selected serving downlink transmit beam. For example, the UE 104 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 506d) on the BS 102 and a single downlink receive beam (e.g., beam 508c) on the UE may form a single downlink BPL used for downlink communication between the BS 102 and the UE 104. In another example, multiple downlink transmit beams (e.g., beams 506c, 506d, and 506c) on the BS 102 and a single downlink receive beam (e.g., beam 508c) on the UE 104 may form respective downlink BPLs used for downlink communication between the BS 102 and the UE 104. In another example, multiple downlink transmit beams (e.g., beams 506c. 506d, and 506c) on the BS 102 and multiple downlink receive beams (e.g., beams 508c and 508d) on the UE 104 may form multiple downlink BPLs used for downlink communication between the BS 102 and the UE 104. In this example, a first downlink BPL may include downlink transmit beam 506c and downlink receive beam 508c, a second downlink BPL may include downlink transmit beam 506d and downlink receive beam 508c, and a third downlink BPL may include downlink transmit beam 506e and downlink receive beam 508d.

When the channel is reciprocal, the above-described downlink beam management scheme may also be used to select one or more uplink BPLs for uplink communication from the UE 104 to the BS 102. For example, the downlink BPL formed of beams 506d and 508e may also serve as an uplink BPL. Here, beam 508c is utilized as an uplink transmit beam, while beam 506d is utilized as an uplink receive beam.

In an example of an uplink beam management scheme, the UE 104 may be configured to sweep or transmit on each of a plurality of uplink transmit beams 508a-508c. For example, the UE 104 may transmit an SRS on each beam in the different beam directions. In addition, the BS 102 may be configured to receive the uplink beam reference signals on a plurality of uplink receive beams 506a-506h. In some examples, the BS 102 searches for and identifies each of the uplink transmit beams 508a-508e based on the beam reference signals. The BS 102 then performs beam measurements (e.g., RSRP, SINR, RSRQ, etc.) on the beam reference signals on each of the uplink receive beams 506a-506h to determine the respective beam quality of each of the uplink transmit beams 508a-508e as measured on each of the uplink receive beams 506a-506h.

The BS 102 may then select one or more uplink transmit beams on which the UE 104 will transmit unicast downlink control information and/or user data traffic to the BS 102. In some examples, the selected uplink transmit beam(s) have the highest gain. The BS 102 may further select a corresponding uplink receive beam on the BS 102 for each selected serving uplink transmit beam to form a respective uplink beam pair link (BPL) for each selected serving uplink transmit beam. For example, the BS 102 can utilize the beam measurements to select the corresponding uplink receive beam for each serving uplink transmit beam. In some examples, the selected uplink receive beam to pair with a particular uplink transmit beam may have the highest gain for that particular uplink transmit beam.

The BS 102 may then notify the UE 104 of the selected uplink transmit beams. For example, the BS 102 may provide the SRS resource identifiers (IDs) identifying the SRSs transmitted on the selected uplink transmit beams. In some examples, the BS 102 may apply each selected uplink transmit beam (and corresponding uplink receive beam) to an uplink signal (e.g., PUCCH, PUSCH, SRS, etc.) and transmit the respective SRS resource IDs associated with the selected uplink transmit beams applied to each uplink signal to the UE 104. When the channel is reciprocal, the above-described uplink beam management scheme may also be used to select one or more downlink BPLs for downlink communication from the BS 102 to the UE 104. For example, the uplink BPLs may also be utilized as downlink BPLs.

Once the downlink and uplink BPLs have been established, the BS 102 and UE 104 may communicate with each other using these BLPs. However, during the course of this communication, the BS 102 and UE 104 may engage in a beam management procedure to ensure that the transmit and receive beams of the downlink/uplink BPLs have not failed due to changes in a communication channel between the BS 102 and the UE 104.

For example, to determine whether transmit beams used by the BS 102 to transmit information to the UE 104 are still usable and have not failed, the BS 102 may transmit reference signals, associated different reference signal resources to different downlink transmit beams. The UE 104 may then measure the reference signals using one or more receive beams. In some cases, the reference signals may comprise SSBs or CSI-RSs and the measurements performed by the UE 104 on these reference signals may comprise layer 1 reference signal receive power (L1 RSRP) measurements.

Thereafter, the UE 104 may transmit a CSI report indicating the measurements to the BS 102 in uplink control information (UCI) transmitted on a physical uplink control channel (PUCCH). In some cases, to distinguish the measurements for each different transmit beam on which the measurements are performed, the CSI report may include different identifiers. For example, when the reference signals comprise CSI-RS, the CSI report may include one or more CSI-RS resource indicator (CRI) fields, each of which may carry an identifier of a corresponding to a different CSI-RS resource and corresponding transmit beam of the BS 102. Similarly, when the reference signals comprise SSBs, the CSI report may include one or more SSB resource indicator (SSBRI) fields, each of which may carry an identifier of a corresponding to a different SSB resource and corresponding transmit beam of the BS 102. Each CRI or SSBRI may be associated with a respective L1-RSRP measurement included within the CSI report.

In some cases, each CSI report transmitted by the UE 104 may include information for four reference signal resources transmitted by the BS 102, as shown in Table 1, below. As noted above, each reference signal resource transmitted by the BS 102 may be associated with a different transmit beam and, as such, each CSI report may carry information for four transmit beams of the BS 102. For example, each CSI report may include four different CRI or SSBRI fields, each associated with and indicating a different transmit beam of the BS 102. Further, as shown, each CSI report may include four different L1-RSRP fields, each associated with one of the CRI or SSBRI fields and providing the RSRP measurements for a corresponding beam. In some cases, the first L1-RSRP field in Table 1 (e.g., CRI or SSBRI #1) may correspond to the transmit beam having a highest L1-RSRP among the four transmit beams. The remaining L1-RSRP fields may include differential L1-RSRPs calculated with respect to the highest L1-RSRP. The bitwidth (e.g., number of bits) for each of the fields included within the CSI report is shown below in Table 2.

TABLE 1

Example CSI Report

| CSI report number | CSI fields |
| --- | --- |
| CSI report #n | CRI or SSBRI #1 |
| | CRI or SSBRI #2 |
| | CRI or SSBRI #3 |
| | CRI or SSBRI #4 |
| | RSRP #1 |
| | Differential RSRP #2 |
| | Differential RSRP #3 |
| | Differential RSRP #4 |

TABLE 2

Example Bitwidths of Fields in a CSI Report

| Field | Bitwidth |
| --- | --- |
| CRI | $[\log_2(K_S^{CSI-RS})]$ |
| SSBRI | $[\log_2(K_S^{SSB})]$ |
| RSRP | 7 |
| Differential RSRP | 4 |

Aspects Related to Beam Management Improvements

Certain wireless communication systems may use communications known as millimeter wave (mmWave) communications, which provide relatively high data rates. mmWave communications may be performed using a set of frequencies within the frequency rage 2 (FR2), which includes frequencies above 24.25 gigahertz (GHz). Communications using mmWave/near mmWave radio frequency band (e.g., 20 GHz-300 GHz) may have higher path loss and a shorter range compared to lower frequency communications. As described above with respect to FIG. 1, when configured to communicate using mmWave/near mmWave radio frequency bands BS 180 and UE 104 may utilize beamforming to improve path loss and range.

UEs may come in all sorts of different shapes and sizes. Due to typical form-factor and cost considerations, most user equipments today are equipped with relatively simple, non-foldable displays. However, foldable/flippable UEs and displays are increasing in popularity, allowing for new degrees of freedom for physical layer communications. For example, one type of antenna module (e.g., a set of antennas integrated with a radio frequency integrated chip (RFIC) for enabling processing at a particular radio frequency level) that may be used to take advantage of these additional degrees of freedom for physical layer communications may include an L-shaped antenna module. In some cases, foldable/flippable UEs that are equipped with an L-shaped antenna module may be used in different operation modes.

Figure 6B:
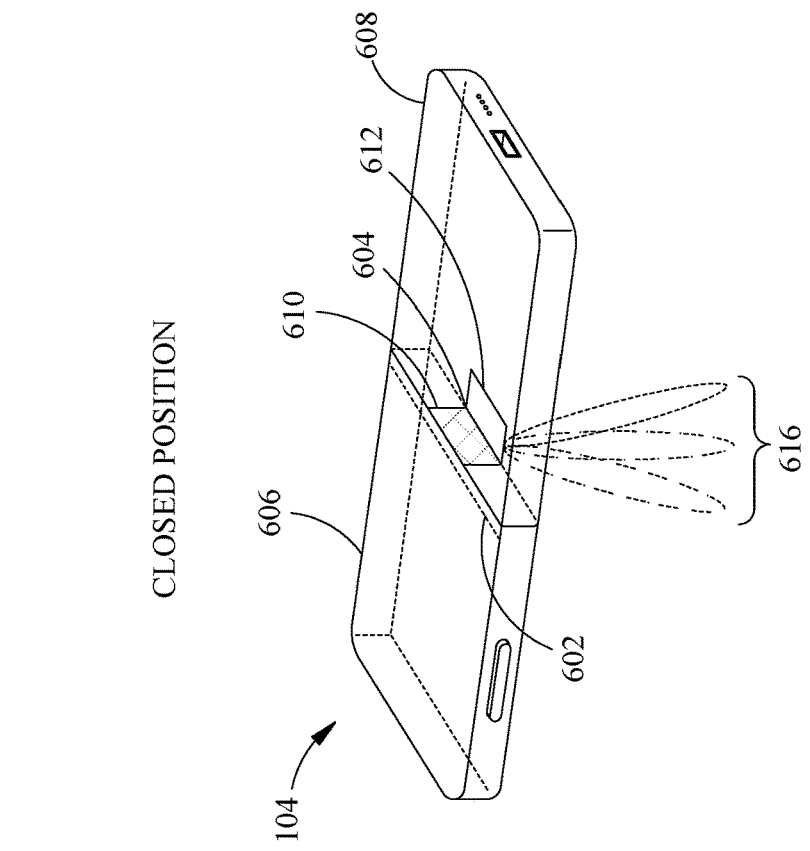
FIGS. 6A and 6B illustrate different operation modes of a foldable/flippable user equipment.
Figure 6A:
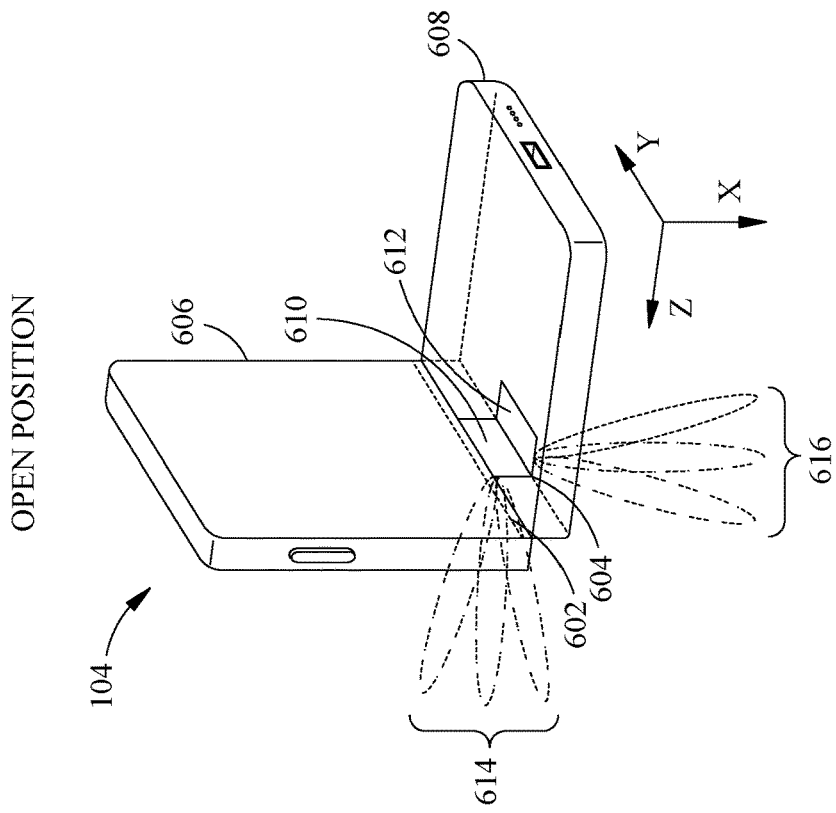

FIGS. 6A and 6B illustrate different operation modes of a foldable/flippable UE, such as the UE 104. While only two operation modes are illustrated, it should be understood that the UE 104 may also operate in other operation modes not illustrated in FIGS. 6A and 6B.

For example, FIG. 6A illustrates a first operation mode of the UE 104 in which a hinge 602 of the UE 104 (e.g., which allows the UE 104 to fold and flip) is in an open position. As shown, the UE 104 includes an upper portion 606 and a lower portion 608 coupled with the upper portion 606 via the hinge 602. Further, as illustrated an L-shaped antenna module 604 having a first side 610 and a second side 612. While in the open position, the UE 104 may be able to communicate using one or more communication beams 614 in a Z-direction using the first side 610 of the L-shaped antenna module 604 and using one or more communication beams 616 in an X-direction using the second side 612 of the L-shaped antenna module 604. Note that X and Z axes are relative to the coordinate system illustrated in FIG. 6A.

FIG. 6B illustrates a second operation mode of the UE 104 in which the hinge 602 of the UE 104 is in a closed position. As shown, while the UE 104 is in the closed position, the first side 610 of the L-shaped antenna module 604 may become occluded (e.g., blocked) by the lower portion 608 of the UE 104 as the upper portion 606 of the UE 104 rotates down to be on the same plane (e.g., ZY-plane) as the lower portion 608. As a result of the first side 610 of the L-shaped antenna module becoming occluded, the one or more communication beams 614 in the Z-direction may become blocked, only allowing the UE 104 to communicate using the one or more communication beams 616 in the X-direction of the second side 612 of the L-shaped antenna module 604 and causing significant performance loss.

In some cases, regardless of whether the UE 104 is able to flip or fold, there may be other operations modes in which the UE 104 may experience performance loss. For example, another operation mode may involve the UE 104 being held by a user in such a manner that one or more fingers of the user are blocking an antenna module of the UE 104. In such cases, the one or more fingers of the user may end up blocking one or more communication beams of the antenna module, forcing the UE 104 to communicate on a limited or reduced number of communication beams and resulting in significant performance loss. Such occlusion by the hand or body parts can lead to failure in communications over a wide range of angles, significantly different from existing beam failure indication mechanisms which capture beam failure over a smaller range of angles.

Not only can different operation modes of the UE 104 lead to significant performance loss, but, in some cases, these different operation modes of the UE 104 may lead to a significant waste of time-frequency resources within a network associated with control channel transmissions. For example, as noted above, the UE 104 may communicate with a network entity, such as the BS 102, using beamforming. When communicating using beamforming, the BS 102 and UE 104 may use one or more pairs of communication beams, each pair of which may be associated with a particular transmission configuration indicator (TCI) state. For example, in some cases, the BS 102 may transmit downlink information to the UE 104 using a downlink transmit beam of the BS 102 that is paired with a downlink receive beam of the UE 104. Similarly, the UE 104 may transmit uplink information to the BS 102 using an uplink transmit beam of the UE 104 that is paired with an uplink receive beam of the BS 102. In some cases, when a channel used for the communication is reciprocal, the uplink transmit beam at the UE side may be the same as (or can be derived from) the downlink receive beam at the UE side.

In some cases, each pair of communication beams described above may be associated with or defined by a particular transmission configuration indicator (TCI) state. For example, in some cases, a first TCI state may define a first pair of communication beams comprising a first communication beam (e.g., a transmit beam or a receive beam) of the BS 102 and a second communication beam (e.g., a transmit beam or a receive beam) of the UE 104. Further, in some cases, a second TCI state may define a second pair of communication beams comprising a third communication beam (e.g., a transmit beam or a receive beam) of the BS 102 and a fourth communication beam (e.g., a transmit beam or a receive beam) of the UE 104.

When communicating using one or more communication beams associated with different TCI states, the UE 104 may be configured to perform L1-RSRP measurements for the one or more communication beams of the different TCI states and routinely transmit CSI reports on a control channel (e.g., physical uplink control channel (PUCCH)) in order to allow the BS 102 to make informed decisions regarding whether the UE 104 needs to switch communication beams when communicating with the BS 102. For example, in some cases, if performance of a communication beam used for communicating with the BS 102 significantly degrades, the BS 102 may be able to instruct the UE 104 to switch to another communication beam with better performance. In some cases, the CSI reports that may be used by the BS 102 may indicate the top four TCI states/communication beams that may be used for beam switching via SSBRI and provide their corresponding L1-RSRP measurements.

However, as described above with respect to FIGS. 6A and 6B, the UE 104 may operate in different operation modes which may affect the performance of the one or more communication beams/TCI states. Table 3, below, provides an example of performance losses that the UE 104 may experience when transitioning between the first operation mode (e.g., the open position described in FIG. 6A) and the second operation mode (e.g., the closed position described in FIG. 6B).

TABLE 3

Example Performance Loss between Operation Modes

| UE direction | gNB direction | 'Open' → 'Closed' transition |
|---|---|---|
| Beam 1: $\theta = 90°$ and $\varphi = 0°$ | TCI state k | <0.5 dB loss |
| Beam 2: $\theta = 45°$ and $\varphi = 180°$ | TCI state l | >5 dB loss |

TABLE 3-continued

Example Performance Loss between Operation Modes

| UE direction | gNB direction | 'Open' → 'Closed' transition |
|---|---|---|
| Beam 3: θ = 80° and φ = 110° | TCI state m | >4 dB loss |
| Beam 4: θ = 90° and φ = 270° | TCI state n | >5 dB loss |

As shown above in Table 3, the UE 104 may be configured with four TCI states (e.g., TCI state k, TCI state l, TCI state m, and TCI state n), each of which may be associated with a different communication beam (e.g., Beam 1, Beam 2, Beam 3, and Beam 4) having a particular beam peak direction defined based on θ and φ. As shown, each communication beam/TCI state may be associated with a particular performance loss when the UE 104 transitions from the first operation mode (e.g., the open position described in FIG. 6A) and the second operation mode (e.g., the closed position described in FIG. 6B). For example, when transitioning from the first operation mode to the second operation mode, Beam 1 associated with TCI state k may experience a performance loss of less than 0.5 dB while Beam 2, Beam 3 and Beam 4 associated with TCI state l, TCI state m, and TCI state n, respectively, may experience a performance loss of greater than 4 or 5 dB.

As a result, mandating the UE 104 to report (e.g., SSBRI, L1-RSRP, etc.) on TCI states l, m, and n associated with the communication beams Beam 2, Beam 3, and Beam 4 may unnecessarily consume time-frequency resources, especially when the UE 104 is operating in a particular operation mode in which performance of the one or more communication beams 614 is expected to be poor, such as the second operation mode. Further, unnecessary communications is also associated with an increase in power consumption at the UE side and the commensurate increase in thermal which needs to be managed with an effective thermal management solution.

Accordingly, in scenarios in which the UE 104 operates in different operation modes (e.g., that may affect performance of certain TCI states/communication beams), rather than having the UE 104 report on all communication beams that may be candidates for beam switching (e.g., via SSBRI), it may be advantageous to allow the UE 104 to indicate failure of a collection of TCI states/communication beams in a certain operation state and report only on a reduced number of TCI states/communication beams. For example, by allowing the UE 104 to report on a reduced number of TCI states/communication beams, the unnecessary consumption of time-frequency resources associated with CSI reporting for TCI states/communication beams that experience significant performance loss in certain operation modes may be reduced.

Example Operations of Entities in a Communications Network

Figure 7:
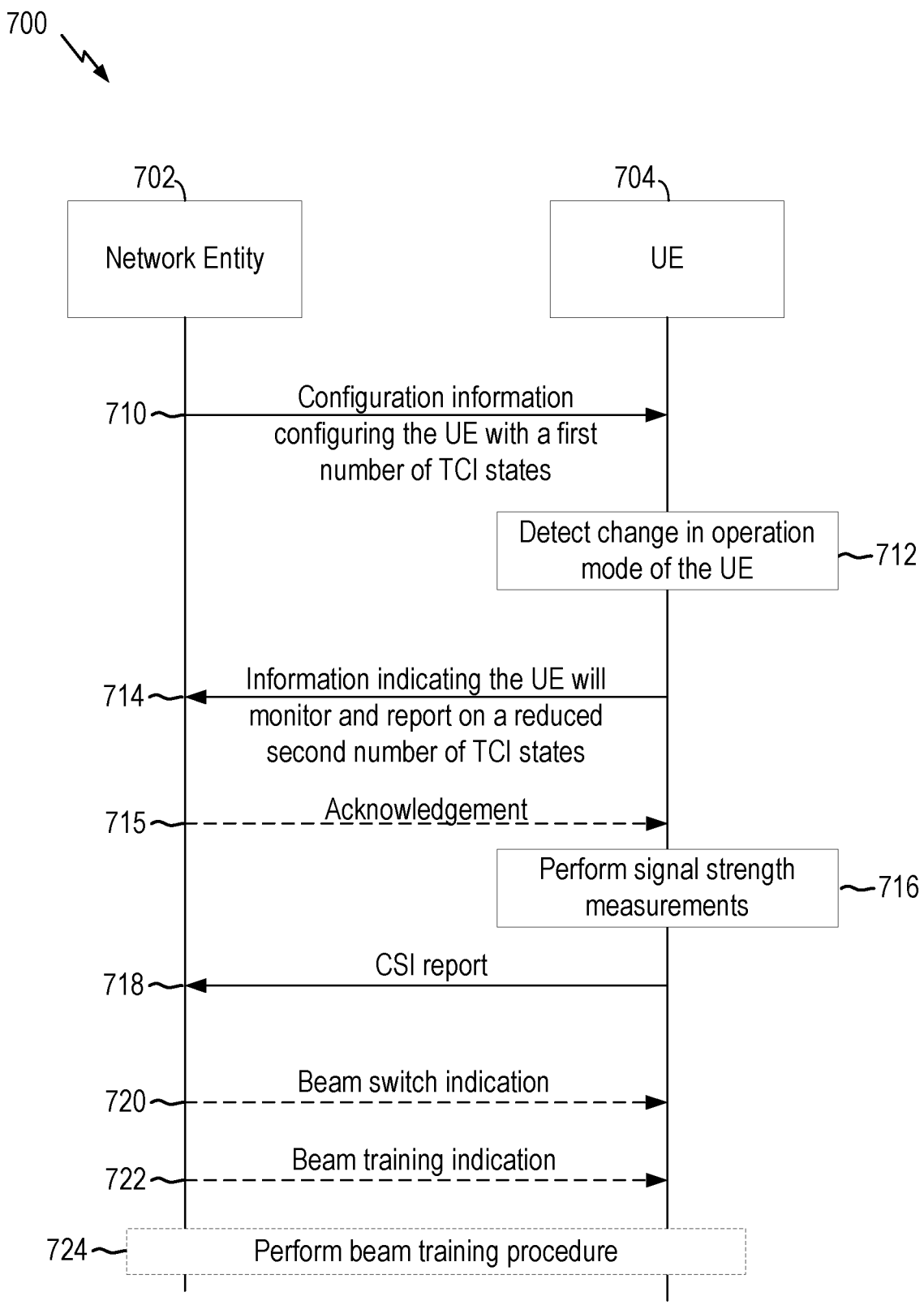
FIG. 7 depicts a process flow for communications in a network between a network entity and a user equipment.

FIG. 7 depicts a process flow including operations 700 for communications in a network between a network entity 702 and a UE 704. In some aspects, the network entity 702 may be an example of the BS 102 depicted and described with respect to FIGS. 1 and 3 or a disaggregated base station depicted and described with respect to FIG. 2. Similarly, the UE 704 may be an example of UE 104 depicted and described with respect to FIGS. 1 and 3. However, in other aspects, UE 104 may be another type of wireless communications device and BS 102 may be another type of network entity or network node, such as those described herein.

As shown, operations 700 begin in step 710 with the UE 704 receiving configuration information from the network entity 702. The configuration information may include parameters and settings that are used to configure and control various aspects of the network. In some cases, the configuration information may include information related to network topology, radio access network (RAN) configuration, core network configuration, security settings, quality of service (QOS) parameters, and other network-specific parameters. For example, in some cases, the configuration information may include one or more parameters that indicate to the UE 704 or configure the UE 704 with a set of TCI states.

In some cases, the configured set of TCI states may comprise a first number of TCI states for use in communicating with the network entity 702. In some cases, each TCI state in the configured set of TCI states may be associated with a respective beam pair between the UE 704 and the network entity 702. Each respective beam pair may include a communication beam of the UE 704 and a communication beam of the network entity 702. In other words, the communication beam of the UE 704 may be paired with the communication beam of the network entity 702. In some cases, for downlink (DL) communication between the network entity 702 and the UE 704, the communication beam of the UE 704 may comprise a DL receive beam and the communication beam of the network entity 702 may comprise a DL transmit beam. In some cases, for uplink (UL) communication between the network entity 702 and the UE 704, the communication beam of the UE 704 may comprise an UL transmit beam and the communication beam of the network entity 702 may comprise an UL receive beam.

In some cases, the configuration information may configure the UE 704 to perform channel state information (CSI) reporting for the first number of TCI states (e.g., for one or more of the communication beam associated with each TCI state in the first number of TCI states). In some cases, the CSI reporting may be used by the network entity 702 for beam switching in which the network entity 702 instructs the UE 704 to switch from a first communication beam/first TCI state of the first number of TCI states to a second communication beam/second TCI state of the first number of TCI states for communication with the network entity 702.

Regarding this CSI reporting, the UE 704 may be configured to perform L1-RSRP measurements for communication beams of the first number of TCI states and transmit a CSI report to the network entity 702. In some cases, the CSI report may include information identifying the communication beams/TCI states for which the L1-RSRP measurements were performed, such as SSBRI. The CSI report may also include the L1-RSRP measurements corresponding to the identified communication beams/TCI states.

As shown in step 712, the UE 704 detects a change in an operation mode of the UE from a first operation mode to a second operation mode. In some cases, the change in the operation mode of the UE is based on at least one of a change in form factor of the UE 704 or an antenna module (e.g., antennas 352*a-r* illustrated of the UE 704 being blocked.

For example, in some cases, the first operation mode may comprise, for example, an operation mode in which communication beams of the first number of TCI states are not blocked and, as such, have RSRP measurements greater than or equal to a particular RSRP threshold. For example, in some cases, when the UE 704 comprises a UE that is foldable/flippable and includes an L-shape antenna module, the first operation mode may correspond to the first operation mode described with respect to FIG. 6A in which the hinge 602 is in the open position and the first side 610 of the L-shaped antenna module 604 is un-occluded. In other cases, the first operation mode may correspond to an operation mode in which a user's (e.g., a user of the UE 704) fingers are not blocking an antenna element of the UE 704.

Correspondingly, the second operation mode may comprise, for example, an operation mode in which one or more of the communication beams of the first number of TCI states are blocked and, as such, have RSRP measurements below the particular RSRP threshold. For example, in some cases, when the UE 704 comprises a UE that is foldable/flippable and includes an L-shape antenna module, the second operation mode may correspond to the second operation mode described with respect to FIG. 6B in which the hinge 602 is in the closed position and the first side 610 of the L-shaped antenna module 604 is occluded. In other cases, the second operation mode may correspond to an operation mode in which the user's (e.g., the user of the UE 704) fingers are blocking an antenna element of the UE 704.

In some cases, the UE 704 may detect the change in the operation mode of the UE 704 based on one or more sensors. For example, in some cases, the UE 704 may be equipped with one or more sensors that are able to sense or detect when a form-factor of the UE 704 changes, such as when the hinge 602 illustrated in FIGS. 6A and 6B transitions from the open position to the closed position. In some cases, the UE 704 may be equipped with one or more sensors that are able to sense when an antenna module of the UE 704 is blocked. In some other instances, the change in operation mode could be based on detection of the presence of hand or body parts on or near the antenna elements in the antenna module. This detection could be enabled with sensors such as the frequency modulated continuous wave (FMCW) type, capacitive sensors, proximity sensors, near field sensors, etc.

As described above, in some cases, the change in the operation mode of the UE 704 may result in one or more TCI states/communication beams in the first number of TCI states being unusable. In such cases, in step 714 of FIG. 7, rather than monitoring and reporting on all TCI states in the first number of TCI states and associated communication beams, the UE 704 may instead transmit, based on the detected change in the operation mode of the UE 704, information to the network entity 702 indicating the UE 704 will monitor and report on a reduced second number of TCI states of the configured set of TCI states relative to the first number of TCI states. In some cases, as shown in step 715, the UE 704 may optionally receive, from the network entity 702, an acknowledgement message, acknowledging the information indicating the UE 704 will monitor and report on the reduced second number of TCI states.

In some cases, the second number of TCI states may include TCI states and communication beams that are still functionally useable by the UE 704 (e.g., TCI states/communication beams having RSRPs greater than or equal to an RSRP threshold or performance losses less than or equal to a performance threshold) for communication with the network entity 702 despite the change in the operation mode of the UE 704. In other words, the UE 704 may forego monitoring and reporting a third number of TCI states in the configured set of TCI states (and associated communication beams) that are functionally unusable by the UE 704 (e.g., TCI states/communication beams having RSRPs less than the RSRP threshold or performance losses greater than the performance threshold) for communication with the network entity 702 due to the change in the operation mode of the UE 704.

In some cases, the UE 704 may receive information, from the network entity 702, indicating a number of operation modes and a list of types of operation modes for which the UE is permitted to monitor and report on the reduced second number of TCI states. In some cases, the TCI states included within the second number of TCI states are different for different types of operation modes of the UE. In some cases, the UE 704 may determine that the second operation mode is within the number of operation modes and list of the types of operations modes for which the UE is permitted to monitor and report on the reduced second number of TCI states.

In such cases, the information transmitted in step 714 may indicate which TCI states of the configured set of TCI states are included within the reduced second number of TCI states that the UE will monitor and report on for the second operation mode. Providing the information indicating which TCI states are included within the reduced second number of TCI states may allow the network entity 702 to properly interpret CSI reports received from the UE 704 associated with only the reduced second number of TCI states (e.g., since the network entity 702 would normally expect that any CSI reports received from the UE 704 be associated with all TCI states in the configured set of TCI states).

In some cases, in addition to or alternative to explicitly indicate which TCI states of the configured set of TCI states are included within the reduced second number of TCI states, the information indicating the UE 704 will monitor and report on the reduced second number of TCI states transmitted by the UE 704 in step 714 ay include information indicating the change in the operation mode of the UE 704. For example, in some cases, the change in the operation mode (e.g., from the first operation mode to the second operation mode) may implicitly indicate to the network entity 702 that the UE 704 intends to reduce the number of TCI states that the UE 704 will monitor and report on. In some cases, the change in the operation mode may also indicate which TCI states of the configured set of TCI states are included within the reduced second number of TCI states that the UE will monitor and report on.

In some cases, the information indicating the UE 704 will monitor and report on the reduced second number of TCI states may comprise information indicating which TCI states of the configured set of TCI states experience one of (1) a performance loss greater than a first performance threshold when changing from the first operation mode to the second operation mode or (2) a performance loss less than a second performance threshold when changing from the first operation mode to the second operation mode. The network entity 702 may then determine which TCI states are included in the reduced second number of TCI states that the UE 704 will monitor and report on based on the indication of which TCI states experience the performance loss greater than the first performance threshold or which TCI states experience the performance loss less than the second performance threshold. In some cases, the UE 704 may receive an indication of the first performance threshold or second performance threshold from the network entity 702.

In some cases, based on the information indicating that the UE 704 will monitor and report on a reduced second number of TCI states of the configured set of TCI states relative to the first number of TCI states, the UE 704 may be configured to perform CSI measurements and transmit CSI reports to the network entity 702 associated with the reduced second number of TCI sates. For example, as shown in step 716 in FIG. 7, the UE 704 may perform signal strength measurements only for communication beams associated with TCI states in the second number of TCI states. In some cases, these signal strength measurements may comprise L1-RSRP measurements. Thereafter, as shown in step 718, the UE 704 may transmit one or more CSI reports to the network entity 702 associated with the reduced second number of TCI sates.

In some cases, each TCI state in the configured set of TCI states (e.g., indicated in the configuration information received in step 710) may be associated with a respective SSBRI. In such cases, the CSI report transmitted by the UE 704 in step 718 may include the respective SSBRI only for each TCI state in the second number of TCI sates and the signal strength measurements only for the communication beams associated with TCI states in the second number of TCI states. Because the UE 704 includes the SSBRIs and signal strength measurements only for the communication beams associated with TCI states in the second number of TCI states, the UE 704 is able to reduce the overhead associated with the CSI report, thereby conserving time-frequency resources within a wireless network in which the network entity 702 and UE 704 operate, as well as conserve power resources at the UE 704. In other words, the UE 704 is able to conserve the time-frequency and power resources by not having to monitor and report on all TCI states and associated communication beams in the configured set of TCI states, such as the third number of TCI states, discussed above, in the set of configured TCI states that are functionally unusable by the UE 704 for communication with the network entity 702.

In some cases, there may be scenarios in which all TCI states within the configured set of TCI states incur a significant performance loss when the operation mode of the UE 704 changes from the first operation mode to the second operation mode. However, there may be other TCI states that, while not within the top-four TCI states (e.g., performance-wise) and thus not included within the configured set of TCI states, may have a reasonable performance level (e.g., equal to or above a performance threshold) across different operation modes, such as across both the first operation mode and second operation mode. In such cases, while the UE 704 may not be configured with these other TCI states, the UE 704 may instead decide to give these other TCI states preference in CSI reporting due to their reasonable performance level across the different operation modes.

Accordingly, for example, when generating the CSI report, the UE 704 may give preference to beam candidates associated with TCI states in a non-configured set of TCI states that do not experience a performance loss greater than a threshold performance due to the change in operation mode of the UE 704 over TCI states in the configured set of TCI states that do experience a performance loss greater than the threshold performance due to the change in operation mode of the UE 704. For example, in some cases, the UE 704 may perform L1-RSRP measurements in step 716 for TCI states in the non-configured set of TCI states and include these L1-RSRP measurements, as well as the SSBRIs associated with the TCI states in the non-configured set of TCI states, within the CSI report transmitted in step 718.

In some cases, as shown in step 720, the UE 704 may optionally receive, from the network entity, an indication to switch to a communication beam associated with a TCI state in the second number of TCI states. In some cases, the UE 704 may receive the indication to switch to the communication beam associated with a TCI state in the second number of TCI states based on the CSI report transmitted in step 718.

In some cases, as shown in step 722, the UE 704 may optionally receive an indication to perform beam training to determine additional TCI states and associated beam pairs to communicate with the network entity 702. In some cases, the UE 704 may receive the indication to perform the beam training based on the information indicating the UE will monitor and report on the reduced second number of TCI states. In some cases, in response to receiving the indication to perform the beam training, the UE 704 may perform, in step 724, the beam training procedure with the network entity 702 to determine the additional TCI states and the associated beam pairs to communicate with the network entity 702.

Example Operations

Figure 8:
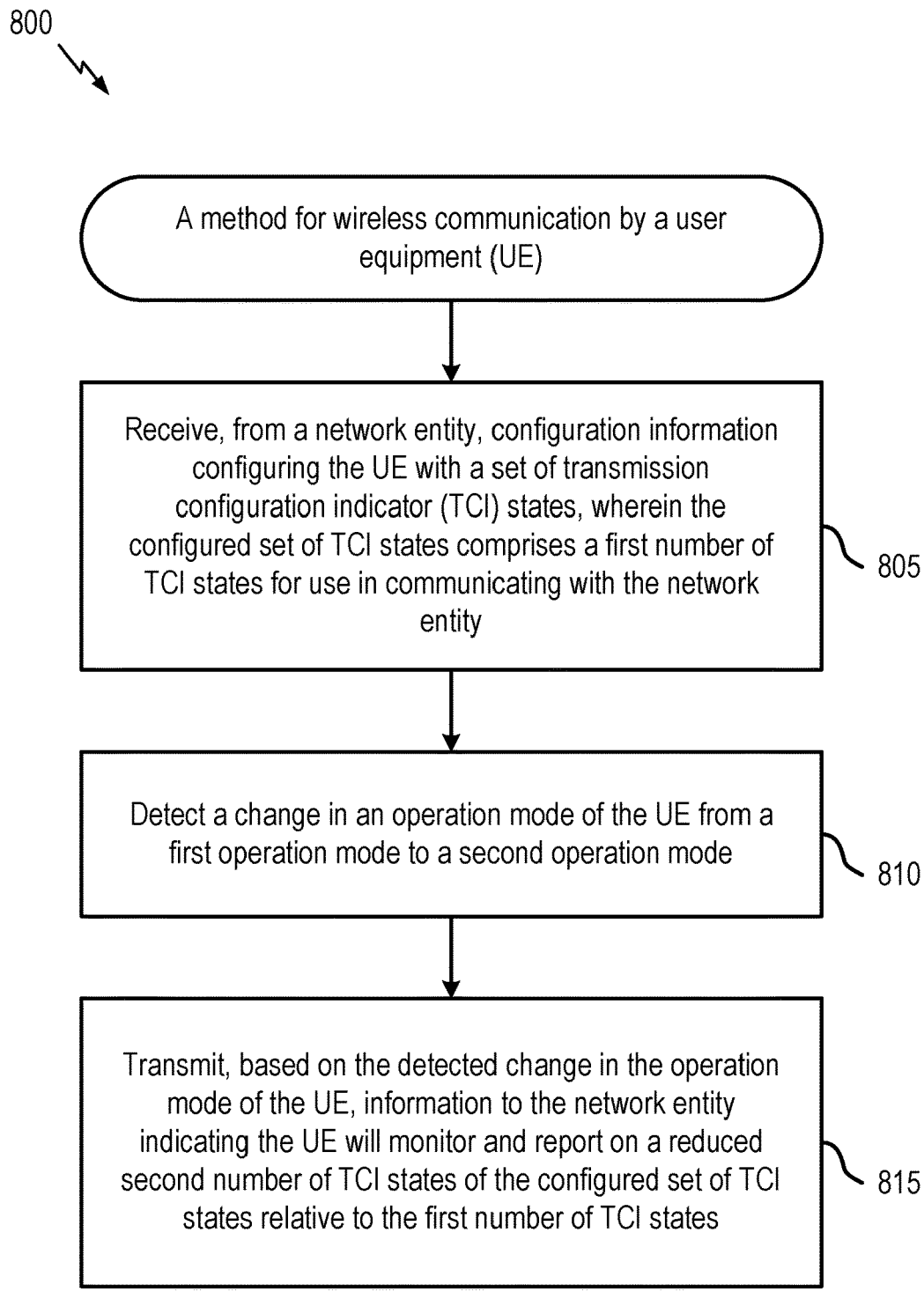
FIG. 8 depicts a method for wireless communications.

FIG. 8 shows an example of a method 800 of wireless communication by a user equipment (UE), such as a UE 104 of FIGS. 1 and 3.

Method 800 begins at step 805 with receiving, from a network entity, configuration information configuring the UE with a set of transmission configuration indicator (TCI) states, wherein the configured set of TCI states comprises a first number of TCI states for use in communicating with the network entity. In some cases, the operations of this step refer to, or may be performed by, circuitry for receiving and/or code for receiving as described with reference to FIG. 10.

Method 800 then proceeds to step 810 with detecting a change in an operation mode of the UE from a first operation mode to a second operation mode. In some cases, the operations of this step refer to, or may be performed by, circuitry for detecting and/or code for detecting as described with reference to FIG. 10.

Method 800 then proceeds to step 815 with transmitting, based on the detected change in the operation mode of the UE, information to the network entity indicating the UE will monitor and report on a reduced second number of TCI states of the configured set of TCI states relative to the first number of TCI states. In some cases, the operations of this step refer to, or may be performed by, circuitry for transmitting and/or code for transmitting as described with reference to FIG. 10.

In some aspects, each TCI state in the configured set of TCI states is associated with a respective beam pair between the UE and the network entity comprising a communication beam of the UE and communication beam of the network entity.

In some aspects, the method 800 further includes transmitting a channel state information (CSI) report to the network entity associated with the reduced second number of TCI sates. In some cases, the operations of this step refer to, or may be performed by, circuitry for transmitting and/or code for transmitting as described with reference to FIG. 10.

In some aspects, the method 800 further includes performing signal strength measurements only for communication beams associated with TCI states in the reduced second number of TCI states. In some cases, the operations of this step refer to, or may be performed by, circuitry for performing and/or code for performing as described with reference to FIG. 10.

In some aspects, each TCI state in the configured set of TCI states is associated with a respective synchronization signal block resource indicator (SSBRI).

In some aspects, the CSI report includes: the respective SSBRI only for each TCI state in the reduced second number of TCI sates; and the signal strength measurements only for the communication beams associated with TCI states in the reduced second number of TCI states.

In some aspects, the method 800 further includes giving preference, when generating the CSI report, to beam candidates associated with TCI states in a non-configured set of TCI states that do not experience a performance loss greater than a threshold performance due to the change in operation mode of the UE over TCI states in the configured set of TCI states that do experience a performance loss greater than the threshold performance due to the change in operation mode of the UE. In some cases, the operations of this step refer to, or may be performed by, circuitry for giving and/or code for giving as described with reference to FIG. 10.

In some aspects, the information indicates which TCI states of the configured set of TCI states are included within the reduced second number of TCI states that the UE will monitor and report on for the second operation mode.

In some aspects, the method 800 further includes receiving information, from the network entity, indicating a number of operation modes and a list of types of operation modes for which the UE is permitted to monitor and report on the reduced second number of TCI states. In some cases, the operations of this step refer to, or may be performed by, circuitry for receiving and/or code for receiving as described with reference to FIG. 10.

In some aspects, the TCI states included within the reduced second number of TCI states are different for different types of operation modes of the UE.

In some aspects, the information indicating the UE will monitor and report on the reduced second number of TCI states comprises information indicating the change in the operation mode of the UE.

In some aspects, the information indicating the UE will monitor and report on the reduced second number of TCI states comprises information indicating which TCI states of the configured set of TCI states experience one of: a performance loss greater than a first performance threshold when changing from the first operation mode to the second operation mode; or a performance loss less than a second performance threshold when changing from the first operation mode to the second operation mode.

In some aspects, the method 800 further includes receiving an indication of the first performance threshold or second performance threshold from the network entity. In some cases, the operations of this step refer to, or may be performed by, circuitry for receiving and/or code for receiving as described with reference to FIG. 10.

In some aspects, the change in the operation mode of the UE is based on at least one of a change in form factor of the UE or an antenna module of the UE being blocked.

In some aspects, the method 800 further includes receiving, from the network entity, an indication to switch to a communication beam associated with a TCI state in the reduced second number of TCI states. In some cases, the operations of this step refer to, or may be performed by, circuitry for receiving and/or code for receiving as described with reference to FIG. 10.

In some aspects, the method 800 further includes receiving, based on the information indicating the UE will monitor and report on the reduced second number of TCI states, an indication to perform beam training to determine additional TCI states and associated beam pairs to communicate with the network entity. In some cases, the operations of this step refer to, or may be performed by, circuitry for receiving and/or code for receiving as described with reference to FIG. 10.

In some aspects, the method 800 further includes receiving, from the network entity, an acknowledgement message, acknowledging the information indicating the UE will monitor and report on the reduced second number of TCI states. In some cases, the operations of this step refer to, or may be performed by, circuitry for receiving and/or code for receiving as described with reference to FIG. 10.

Figure 10:
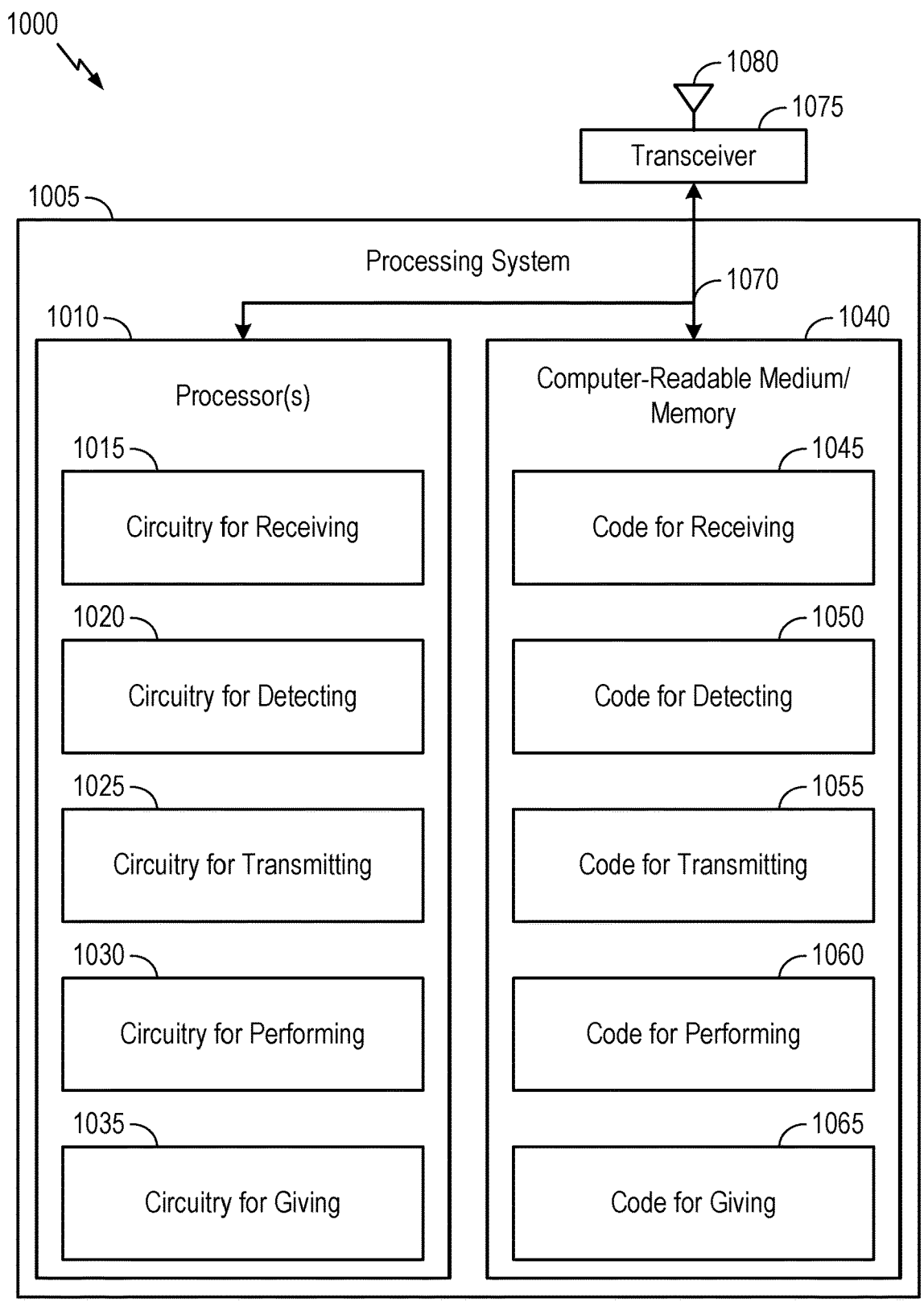
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Figure 9:
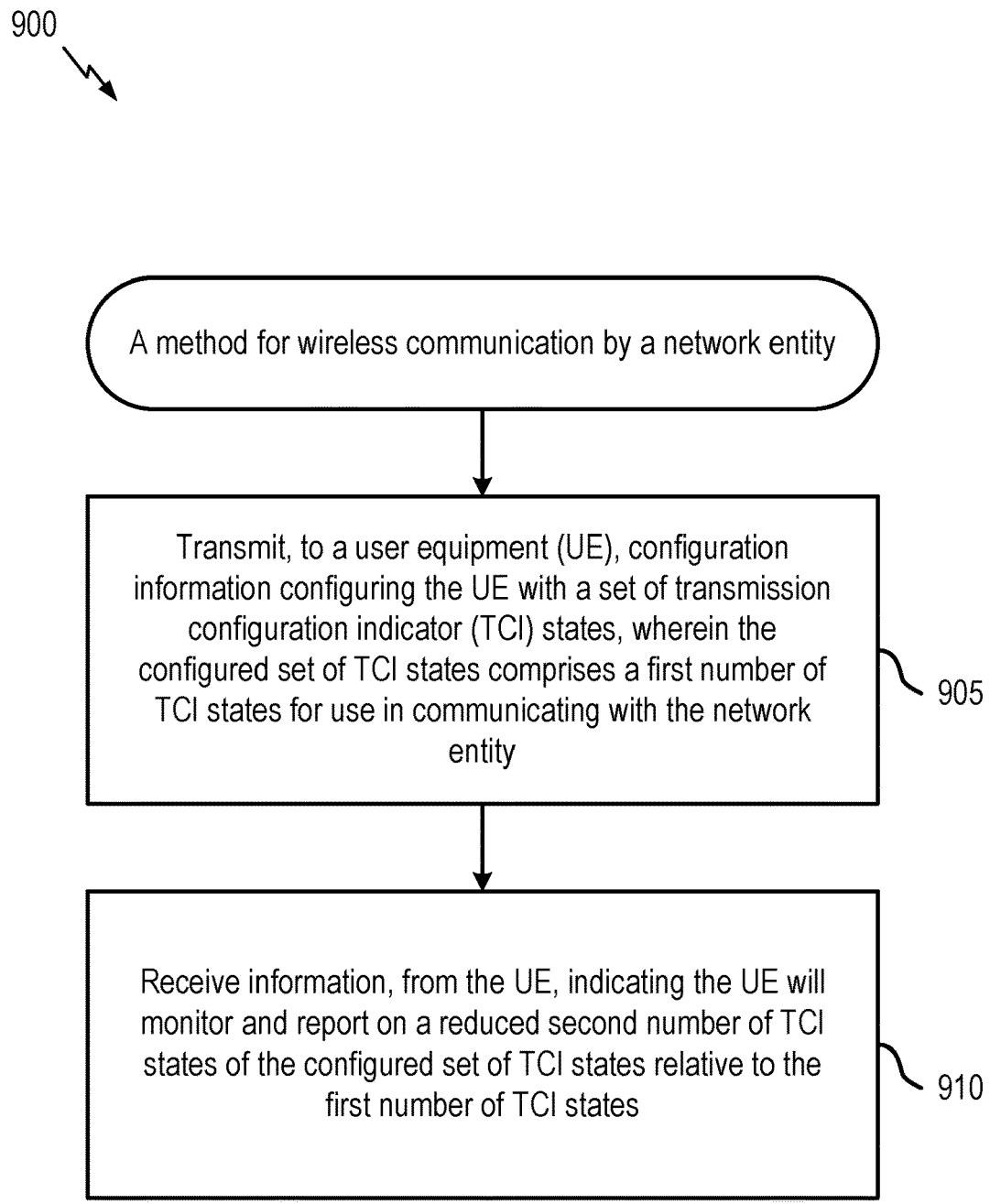
FIG. 9 depicts a method for wireless communications.

FIG. 9 shows an example of a method 900 of wireless communication by a network entity, such as a BS 102 of FIGS. 1 and 3, or a disaggregated base station as discussed with respect to FIG. 2.

Method 900 begins at step 905 with transmitting, to a user equipment (UE), configuration information configuring the UE with a set of transmission configuration indicator (TCI) states, wherein the configured set of TCI states comprises a first number of TCI states for use in communicating with the network entity. In some cases, the operations of this step refer to, or may be performed by, circuitry for transmitting and/or code for transmitting as described with reference to FIG. 11.

Method 900 then proceeds to step 910 with receiving information, from the UE, indicating the UE will monitor and report on a reduced second number of TCI states of the configured set of TCI states relative to the first number of TCI states. In some cases, the operations of this step refer to, or may be performed by, circuitry for receiving and/or code for receiving as described with reference to FIG. 11.

In some aspects, the information indicating the UE will monitor and report on the reduced second number of TCI states is based on a change in an operation mode of the UE.

In some aspects, the change in the operation mode of the UE is based on at least one of a change in form factor of the UE or an antenna module of the UE being blocked.

In some aspects, each TCI state in the configured set of TCI states is associated with a respective beam pair between the UE and the network entity comprising a communication beam of the UE and communication beam of the network entity.

In some aspects, the method 900 further includes receiving a channel state information (CSI) report from the UE associated with the reduced second number of TCI sates. In some cases, the operations of this step refer to, or may be performed by, circuitry for receiving and/or code for receiving as described with reference to FIG. 11.

In some aspects, each TCI state in the configured set of TCI states is associated with a respective synchronization signal block resource indicator (SSBRI).

In some aspects, the CSI report includes: the respective SSBRI only for each TCI state in the reduced second number of TCI sates; and signal strength measurements only for communication beams associated with TCI states in the reduced second number of TCI states.

In some aspects, the CSI report includes information for beam candidates associated with TCI states in a non-configured set of TCI states that do not experience a performance loss greater than a threshold performance due to a change in operation mode of the UE.

In some aspects, the information indicates which TCI states of the configured set of TCI states are included within the reduced second number of TCI states that the UE will monitor and report on.

In some aspects, the method 900 further includes transmitting information, to the UE, indicating a number of operation modes and a list of types of operation modes for which the UE is permitted to monitor and report on the reduced second number of TCI states. In some cases, the operations of this step refer to, or may be performed by, circuitry for transmitting and/or code for transmitting as described with reference to FIG. 11.

In some aspects, the TCI states included within the reduced second number of TCI states are different for different types of operation modes of the UE.

In some aspects, the information indicating the UE will monitor and report on the reduced second number of TCI states comprises information indicating a change in an operation mode of the UE.

In some aspects, the information indicating the UE will monitor and report on the reduced second number of TCI states comprises information indicating which TCI states of the configured set of TCI states experience one of: a performance loss greater than a first performance threshold when changing from a first operation mode to a second operation mode; or a performance loss less than a second performance threshold when changing from a first operation mode to a second operation mode.

In some aspects, the method 900 further includes transmitting, to the UE, an indication of the first performance threshold or second performance threshold. In some cases, the operations of this step refer to, or may be performed by, circuitry for transmitting and/or code for transmitting as described with reference to FIG. 11.

In some aspects, the method 900 further includes transmitting, to the UE, an indication to switch to a communication beam associated with a TCI state in the reduced second number of TCI states. In some cases, the operations of this step refer to, or may be performed by, circuitry for transmitting and/or code for transmitting as described with reference to FIG. 11.

In some aspects, the method 900 further includes transmitting, to the UE based on the information indicating the UE will monitor and report on the reduced second number of TCI states, an indication to perform beam training to determine additional TCI states and associated beam pairs to communicate with the network entity. In some cases, the operations of this step refer to, or may be performed by, circuitry for transmitting and/or code for transmitting as described with reference to FIG. 11.

In some aspects, the method 900 further includes transmitting, to the UE, an acknowledgement message, acknowledging the information indicating the UE will monitor and report on the reduced second number of TCI states. In some cases, the operations of this step refer to, or may be performed by, circuitry for transmitting and/or code for transmitting as described with reference to FIG. 11.

Figure 11:
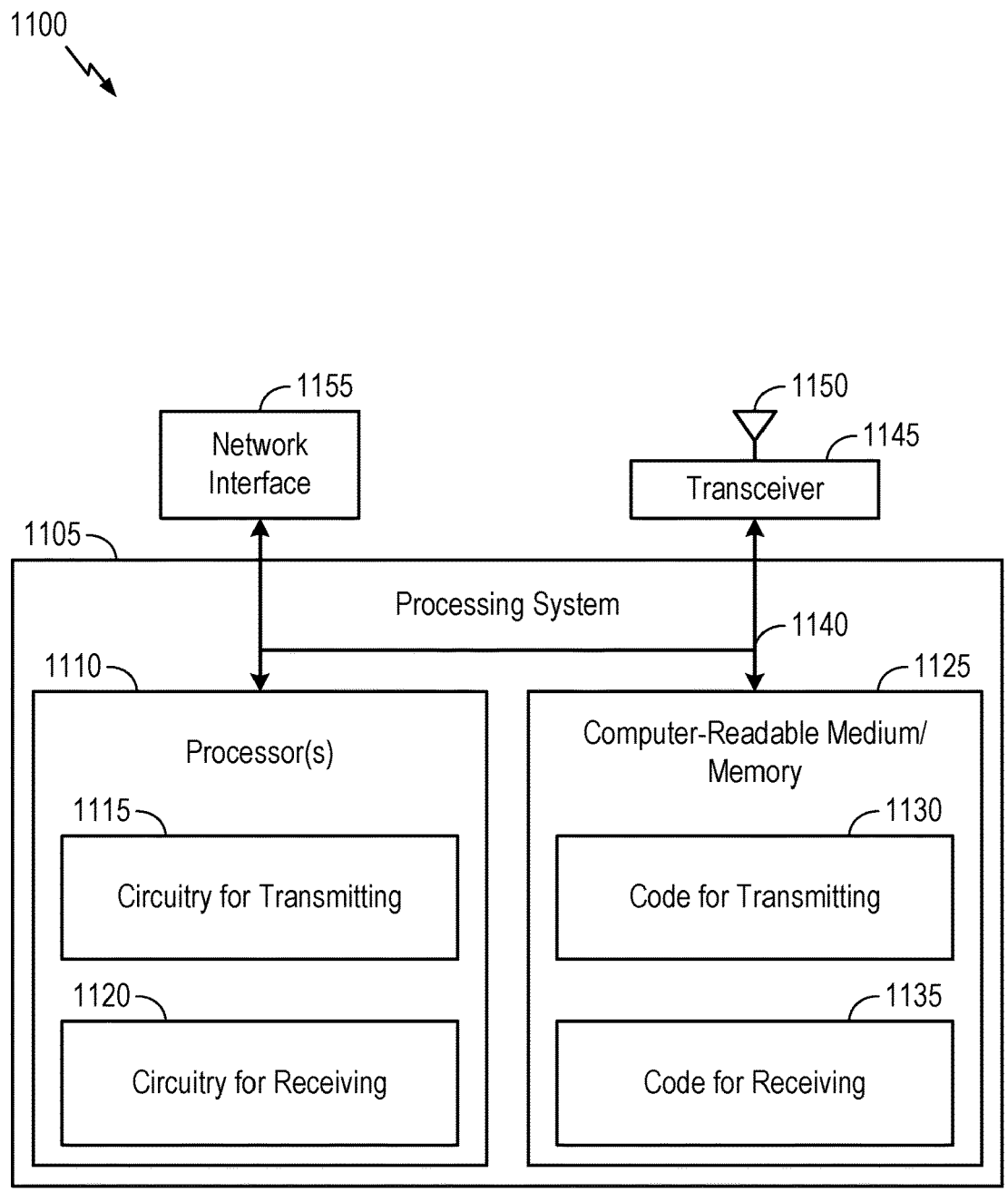
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Communications Device(s)

FIG. 10 depicts aspects of an example communications device 1000. In some aspects, communications device 1000 is a user equipment, such as UE 104 described above with respect to FIGS. 1 and 3.

The communications device 1000 includes a processing system 1005 coupled to the transceiver 1075 (e.g., a transmitter and/or a receiver). The transceiver 1075 is configured to transmit and receive signals for the communications device 1000 via the antenna 1080, such as the various signals as described herein. The processing system 1005 may be configured to perform processing functions for the communications device 1000, including processing signals received and/or to be transmitted by the communications device 1000.

The processing system 1005 includes one or more processors 1010. In various aspects, the one or more processors 1010 may be representative of one or more of receive processor 358, transmit processor 364, TX MIMO processor 366, and/or controller/processor 380, as described with respect to FIG. 3. The one or more processors 1010 are coupled to a computer-readable medium/memory 1040 via a bus 1070. In certain aspects, the computer-readable medium/memory 1040 is configured to store instructions (e.g., computer-executable code) that when executed by the one or more processors 1010, cause the one or more processors 1010 to perform the method 800 described with respect to FIG. 8, or any aspect related to it. Note that reference to a processor performing a function of communications device 1000 may include one or more processors 1010 performing that function of communications device 1000.

In the depicted example, computer-readable medium/memory 1040 stores code (e.g., executable instructions), such as code for receiving 1045, code for detecting 1050, code for transmitting 1055, code for performing 1060, and code for giving 1065. Processing of the code for receiving 1045, code for detecting 1050, code for transmitting 1055, code for performing 1060, and code for giving 1065 may cause the communications device 1000 to perform the method 800 described with respect to FIG. 8, or any aspect related to it.

The one or more processors 1010 include circuitry configured to implement (e.g., execute) the code stored in the computer-readable medium/memory 1040, including circuitry such as circuitry for receiving 1015, circuitry for detecting 1020, circuitry for transmitting 1025, circuitry for performing 1030, and circuitry for giving 1035. Processing with circuitry for receiving 1015, circuitry for detecting 1020, circuitry for transmitting 1025, circuitry for performing 1030, and circuitry for giving 1035 may cause the communications device 1000 to perform the method 800 described with respect to FIG. 8, or any aspect related to it.

Various components of the communications device 1000 may provide means for performing the method 800 described with respect to FIG. 8, or any aspect related to it. For example, means for transmitting, sending or outputting for transmission may include transceivers 354 and/or antenna(s) 352 of the UE 104 illustrated in FIG. 3 and/or the transceiver 1075 and the antenna 1080 of the communications device 1000 in FIG. 10. Means for receiving or obtaining may include transceivers 354 and/or antenna(s) 352 of the UE 104 illustrated in FIG. 3 and/or the transceiver 1075 and the antenna 1080 of the communications device 1000 in FIG. 10.

FIG. 11 depicts aspects of an example communications device 1100. In some aspects, communications device 1100 is a network entity, such as BS 102 of FIGS. 1 and 3, or a disaggregated base station as discussed with respect to FIG. 2.

The communications device 1100 includes a processing system 1105 coupled to the transceiver 1145 (e.g., a transmitter and/or a receiver) and/or a network interface 1155. The transceiver 1145 is configured to transmit and receive signals for the communications device 1100 via the antenna 1150, such as the various signals as described herein. The network interface 1155 is configured to obtain and send signals for the communications device 1100 via communication link(s), such as a backhaul link, midhaul link, and/or fronthaul link as described herein, such as with respect to FIG. 2. The processing system 1105 may be configured to perform processing functions for the communications device 1100, including processing signals received and/or to be transmitted by the communications device 1100.

The processing system 1105 includes one or more processors 1110. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1125 via a bus 1140. In certain aspects, the computer-readable medium/memory 1125 is configured to store instructions (e.g., computer-executable code) that when executed by the one or more processors 1110, cause the one or more processors 1110 to perform the method 900 described with respect to FIG. 9, or any aspect related to it. Note that reference to a processor of communications device 1100 performing a function may include one or more processors 1110 of communications device 1100 performing that function.

In the depicted example, the computer-readable medium/memory 1125 stores code (e.g., executable instructions), such as code for transmitting 1130 and code for receiving 1135. Processing of the code for transmitting 1130 and code for receiving 1135 may cause the communications device 1100 to perform the method 900 described with respect to FIG. 9, or any aspect related to it.

The one or more processors 1110 include circuitry configured to implement (e.g., execute) the code stored in the computer-readable medium/memory 1125, including circuitry such as circuitry for transmitting 1115 and circuitry for receiving 1120. Processing with circuitry for transmitting 1115 and circuitry for receiving 1120 may cause the communications device 1100 to perform the method 900 described with respect to FIG. 9, or any aspect related to it.

Various components of the communications device 1100 may provide means for performing the method 900 described with respect to FIG. 9, or any aspect related to it. Means for transmitting, sending or outputting for transmission may include transceivers 332 and/or antenna(s) 334 of the BS 102 illustrated in FIG. 3 and/or the transceiver 1145 and the antenna 1150 of the communications device 1100 in FIG. 11. Means for receiving or obtaining may include transceivers 332 and/or antenna(s) 334 of the BS 102 illustrated in FIG. 3 and/or the transceiver 1145 and the antenna 1150 of the communications device 1100 in FIG. 11.

Example Clauses

Implementation examples are described in the following numbered clauses:

Clause 1: A method for wireless communication by a user equipment (UE), comprising: receiving, from a network entity, configuration information configuring the UE with a set of transmission configuration indicator (TCI) states, wherein the configured set of TCI states comprises a first number of TCI states for use in communicating with the network entity; detecting a change in an operation mode of the UE from a first operation mode to a second operation mode; and transmitting, based on the detected change in the operation mode of the UE, information to the network entity indicating the UE will monitor and report on a reduced second number of TCI states of the configured set of TCI states relative to the first number of TCI states.

Clause 2: The method of Clause 1, wherein each TCI state in the configured set of TCI states is associated with a respective beam pair between the UE and the network entity comprising a communication beam of the UE and communication beam of the network entity.

Clause 3: The method of any one of Clauses 1-2, further comprising transmitting a channel state information (CSI) report to the network entity associated with the reduced second number of TCI sates.

Clause 4: The method of Clause 3, further comprising performing signal strength measurements only for communication beams associated with TCI states in the reduced second number of TCI states.

Clause 5: The method of Clause 4, wherein each TCI state in the configured set of TCI states is associated with a respective synchronization signal block resource indicator (SSBRI).

Clause 6: The method of Clause 5, wherein the CSI report includes: the respective SSBRI only for each TCI state in the reduced second number of TCI sates; and the signal strength measurements only for the communication beams associated with TCI states in the reduced second number of TCI states.

Clause 7: The method of Clause 3, further comprising giving preference, when generating the CSI report, to beam candidates associated with TCI states in a non-configured set of TCI states that do not experience a performance loss greater than a threshold performance due to the change in operation mode of the UE over TCI states in the configured set of TCI states that do experience a performance loss greater than the threshold performance due to the change in operation mode of the UE.

Clause 8: The method of any one of Clauses 1-7, wherein the information indicates which TCI states of the configured set of TCI states are included within the reduced second number of TCI states that the UE will monitor and report on for the second operation mode.

Clause 9: The method of Clause 8, further comprising receiving information, from the network entity, indicating a number of operation modes and a list of types of operation modes for which the UE is permitted to monitor and report on the reduced second number of TCI states.

Clause 10: The method of Clause 9, wherein the TCI states included within the reduced second number of TCI states are different for different types of operation modes of the UE.

Clause 11: The method of any one of Clauses 1-10, wherein the information indicating the UE will monitor and report on the reduced second number of TCI states comprises information indicating the change in the operation mode of the UE.

Clause 12: The method of any one of Clauses 1-11, wherein the information indicating the UE will monitor and report on the reduced second number of TCI states comprises information indicating which TCI states of the configured set of TCI states experience one of: a performance loss greater than a first performance threshold when changing from the first operation mode to the second operation mode; or a performance loss less than a second performance threshold when changing from the first operation mode to the second operation mode.

Clause 13: The method of Clause 12, further comprising receiving an indication of the first performance threshold or second performance threshold from the network entity.

Clause 14: The method of any one of Clauses 1-13, wherein the change in the operation mode of the UE is based on at least one of a change in form factor of the UE or an antenna module of the UE being blocked.

Clause 15: The method of any one of Clauses 1-14, further comprising receiving, from the network entity, an indication to switch to a communication beam associated with a TCI state in the reduced second number of TCI states.

Clause 16: The method of any one of Clauses 1-15, further comprising receiving, based on the information indicating the UE will monitor and report on the reduced second number of TCI states, an indication to perform beam training to determine additional TCI states and associated beam pairs to communicate with the network entity.

Clause 17: The method of any one of Clauses 1-16, further comprising receiving, from the network entity, an acknowledgement message, acknowledging the information indicating the UE will monitor and report on the reduced second number of TCI states.

Clause 18: A method for wireless communication by a network entity, comprising: transmitting, to a user equipment (UE), configuration information configuring the UE with a set of transmission configuration indicator (TCI) states, wherein the configured set of TCI states comprises a first number of TCI states for use in communicating with the network entity; and receiving information, from the UE, indicating the UE will monitor and report on a reduced second number of TCI states of the configured set of TCI states relative to the first number of TCI states.

Clause 19: The method of Clause 18, wherein the information indicating the UE will monitor and report on the reduced second number of TCI states is based on a change in an operation mode of the UE.

Clause 20: The method of Clause 19, wherein the change in the operation mode of the UE is based on at least one of a change in form factor of the UE or an antenna module of the UE being blocked.

Clause 21: The method of any one of Clauses 18-20, wherein each TCI state in the configured set of TCI states is associated with a respective beam pair between the UE and the network entity comprising a communication beam of the UE and communication beam of the network entity.

Clause 22: The method of any one of Clauses 18-21, further comprising receiving a channel state information (CSI) report from the UE associated with the reduced second number of TCI sates.

Clause 23: The method of Clause 22, wherein each TCI state in the configured set of TCI states is associated with a respective synchronization signal block resource indicator (SSBRI).

Clause 24: The method of Clause 23, wherein the CSI report includes: the respective SSBRI only for each TCI state in the reduced second number of TCI sates; and signal strength measurements only for communication beams associated with TCI states in the reduced second number of TCI states.

Clause 25: The method of Clause 22, wherein the CSI report includes information for beam candidates associated with TCI states in a non-configured set of TCI states that do not experience a performance loss greater than a threshold performance due to a change in operation mode of the UE.

Clause 26: The method of any one of Clauses 18-25, wherein the information indicates which TCI states of the configured set of TCI states are included within the reduced second number of TCI states that the UE will monitor and report on.

Clause 27: The method of Clause 26, further comprising transmitting information, to the UE, indicating a number of operation modes and a list of types of operation modes for which the UE is permitted to monitor and report on the reduced second number of TCI states.

Clause 28: The method of Clause 27, wherein the TCI states included within the reduced second number of TCI states are different for different types of operation modes of the UE.

Clause 29: The method of any one of Clauses 18-28, wherein the information indicating the UE will monitor and report on the reduced second number of TCI states comprises information indicating a change in an operation mode of the UE.

Clause 30: The method of any one of Clauses 18-29, wherein the information indicating the UE will monitor and report on the reduced second number of TCI states comprises information indicating which TCI states of the configured set of TCI states experience one of: a performance loss greater than a first performance threshold when changing from a first operation mode to a second operation mode; or a performance loss less than a second performance threshold when changing from a first operation mode to a second operation mode.

Clause 31: The method of Clause 30, further comprising transmitting, to the UE, an indication of the first performance threshold or second performance threshold.

Clause 32: The method of any one of Clauses 18-31, further comprising transmitting, to the UE, an indication to switch to a communication beam associated with a TCI state in the reduced second number of TCI states.

Clause 33: The method of any one of Clauses 18-32, further comprising transmitting, to the UE based on the information indicating the UE will monitor and report on the reduced second number of TCI states, an indication to perform beam training to determine additional TCI states and associated beam pairs to communicate with the network entity.

Clause 34: The method of any one of Clauses 18-33, further comprising transmitting, to the UE, an acknowledgement message, acknowledging the information indicating the UE will monitor and report on the reduced second number of TCI states.

Clause 35: An apparatus, comprising: a memory comprising executable instructions; and a processor configured to execute the executable instructions and cause the apparatus to perform a method in accordance with any one of Clauses 1-34.

Clause 36: An apparatus, comprising means for performing a method in accordance with any one of Clauses 1-34.

Clause 37: A non-transitory computer-readable medium comprising executable instructions that, when executed by a processor of an apparatus, cause the apparatus to perform a method in accordance with any one of Clauses 1-34.

Clause 38: A computer program product embodied on a computer-readable storage medium comprising code for performing a method in accordance with any one of Clauses 1-34.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
    receiving, from a network entity, configuration information configuring the UE with a set of transmission configuration indicator (TCI) states, wherein the configured set of TCI states comprises a first number of TCI states for use in communicating with the network entity;
    detecting a change in an operation mode of the UE from a first operation mode to a second operation mode; and
    transmitting, based on the detected change in the operation mode of the UE, information to the network entity indicating the UE will monitor and report on a reduced second number of TCI states of the configured set of TCI states relative to the first number of TCI states.

2. The method of claim 1, wherein each TCI state in the configured set of TCI states is associated with a respective beam pair between the UE and the network entity comprising a communication beam of the UE and communication beam of the network entity.

3. The method of claim 1, further comprising transmitting a channel state information (CSI) report to the network entity associated with the reduced second number of TCI sates.

4. The method of claim 3, further comprising performing signal strength measurements only for communication beams associated with TCI states in the reduced second number of TCI states.

5. The method of claim 4, wherein:
    each TCI state in the configured set of TCI states is associated with a respective synchronization signal block resource indicator (SSBRI); and
    the CSI report includes:
        the respective SSBRI only for each TCI state in the reduced second number of TCI sates; and the signal strength measurements only for the communication beams associated with TCI states in the reduced second number of TCI states.

6. The method of claim 3, further comprising, when generating the CSI report, giving preference to beam candidates associated with TCI states in a non-configured set of TCI states that do not experience a performance loss greater than a threshold performance due to the change in operation mode of the UE over TCI states in the configured set of TCI states that do experience a performance loss greater than the threshold performance due to the change in operation mode of the UE.

7. The method of claim 1, wherein:
the information indicates which TCI states of the configured set of TCI states are included within the reduced second number of TCI states that the UE will monitor and report on for the second operation mode;
the method further comprises receiving information, from the network entity, indicating a number of operation modes and a list of types of operation modes for which the UE is permitted to monitor and report on the reduced second number of TCI states; and
the TCI states included within the reduced second number of TCI states are different for different types of operation modes of the UE.

8. The method of claim 1, wherein the information indicating the UE will monitor and report on the reduced second number of TCI states comprises information indicating the change in the operation mode of the UE.

9. The method of claim 1, wherein the information indicating the UE will monitor and report on the reduced second number of TCI states comprises information indicating which TCI states of the configured set of TCI states experience one of:
a performance loss greater than a first performance threshold when changing from the first operation mode to the second operation mode; or
a performance loss less than a second performance threshold when changing from the first operation mode to the second operation mode.

10. The method of claim 9, further comprising receiving an indication of the first performance threshold or second performance threshold from the network entity.

11. The method of claim 1, wherein the change in the operation mode of the UE is based on at least one of a change in form factor of the UE or an antenna module of the UE being blocked.

12. The method of claim 1, further comprising receiving, from the network entity, an indication to switch to a communication beam associated with a TCI state in the reduced second number of TCI states.

13. The method of claim 1, further comprising receiving, based on the information indicating the UE will monitor and report on the reduced second number of TCI states, an indication to perform beam training to determine additional TCI states and associated beam pairs to communicate with the network entity.

14. The method of claim 1, further comprising receiving, from the network entity, an acknowledgement message, acknowledging the information indicating the UE will monitor and report on the reduced second number of TCI states.

15. A method for wireless communication by a network entity, comprising:
transmitting, to a user equipment (UE), configuration information configuring the UE with a set of transmission configuration indicator (TCI) states, wherein the configured set of TCI states comprises a first number of TCI states for use in communicating with the network entity; and
receiving information, from the UE, indicating the UE will monitor and report on a reduced second number of TCI states of the configured set of TCI states relative to the first number of TCI states.

16. The method of claim 15, wherein the information indicating the UE will monitor and report on the reduced second number of TCI states is based on a change in an operation mode of the UE.

17. The method of claim 16, wherein the change in the operation mode of the UE is based on at least one of a change in form factor of the UE or an antenna module of the UE being blocked.

18. The method of claim 15, wherein each TCI state in the configured set of TCI states is associated with a respective beam pair between the UE and the network entity comprising a communication beam of the UE and communication beam of the network entity.

19. The method of claim 15, further comprising receiving a channel state information (CSI) report from the UE associated with the reduced second number of TCI sates.

20. The method of claim 19, wherein:
each TCI state in the configured set of TCI states is associated with a respective synchronization signal block resource indicator (SSBRI); and
the CSI report includes:
the respective SSBRI only for each TCI state in the reduced second number of TCI sates; and
signal strength measurements only for communication beams associated with TCI states in the reduced second number of TCI states.

21. The method of claim 19, wherein the CSI report includes information for beam candidates associated with TCI states in a non-configured set of TCI states that do not experience a performance loss greater than a threshold performance due to a change in operation mode of the UE.

22. The method of claim 15, wherein:
the information indicates which TCI states of the configured set of TCI states are included within the reduced second number of TCI states that the UE will monitor and report on;
the method further comprises transmitting information, to the UE, indicating a number of operation modes and a list of types of operation modes for which the UE is permitted to monitor and report on the reduced second number of TCI states; and
the TCI states included within the reduced second number of TCI states are different for different types of operation modes of the UE.

23. The method of claim 15, wherein the information indicating the UE will monitor and report on the reduced second number of TCI states comprises information indicating a change in an operation mode of the UE.

24. The method of claim 15, wherein the information indicating the UE will monitor and report on the reduced second number of TCI states comprises information indicating which TCI states of the configured set of TCI states experience one of:
a performance loss greater than a first performance threshold when changing from a first operation mode to a second operation mode; or
a performance loss less than a second performance threshold when changing from a first operation mode to a second operation mode.

25. The method of claim 24, further comprising transmitting, to the UE, an indication of the first performance threshold or second performance threshold.

26. The method of claim 15, further comprising transmitting, to the UE, an indication to switch to a communication beam associated with a TCI state in the reduced second number of TCI states.

27. The method of claim 15, further comprising transmitting, to the UE based on the information indicating the UE will monitor and report on the reduced second number of TCI states, an indication to perform beam training to determine additional TCI states and associated beam pairs to communicate with the network entity.

28. The method of claim 15, further comprising transmitting, to the UE, an acknowledgement message, acknowledging the information indicating the UE will monitor and report on the reduced second number of TCI states.

29. An apparatus for wireless communication by a user equipment (UE), comprising:
memory comprising executable instructions; and
one or more processors configured to execute the executable instructions and cause the apparatus to:
receive, from a network entity, configuration information configuring the UE with a set of transmission configuration indicator (TCI) states, wherein the configured set of TCI states comprises a first number of TCI states for use in communicating with the network entity;
detect a change in an operation mode of the UE from a first operation mode to a second operation mode; and
transmit, based on the detected change in the operation mode of the UE, information to the network entity indicating the UE will monitor and report on a reduced second number of TCI states of the configured set of TCI states relative to the first number of TCI states.

30. An apparatus for wireless communication by a network entity, comprising:
memory comprising executable instructions; and
one or more processors configured to execute the executable instructions and cause the apparatus to:
transmit, to a user equipment (UE), configuration information configuring the UE with a set of transmission configuration indicator (TCI) states, wherein the configured set of TCI states comprises a first number of TCI states for use in communicating with the network entity; and
receive information, from the UE, indicating the UE will monitor and report on a reduced second number of TCI states of the configured set of TCI states relative to the first number of TCI states.

* * * * *